(12) United States Patent
Horiyama

(10) Patent No.: US 7,197,004 B2
(45) Date of Patent: Mar. 27, 2007

(54) OPTICAL PICK-UP APPARATUS

(75) Inventor: Makoto Horiyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 556 days.

(21) Appl. No.: 10/647,054

(22) Filed: Aug. 21, 2003

(65) Prior Publication Data

US 2005/0030877 A1 Feb. 10, 2005

(30) Foreign Application Priority Data

Aug. 23, 2002 (JP) ............. P2002-244083

(51) Int. Cl.
*G11B 7/00* (2006.01)
(52) U.S. Cl. ............. 369/112.03; 369/112.01; 369/44.37; 369/44.12
(58) Field of Classification Search ............. None
See application file for complete search history.

(56) References Cited

U.S. PATENT DOCUMENTS

| | | | | |
|---|---|---|---|---|
| 5,490,133 A | * | 2/1996 | Nakamura et al. | 369/44.23 |
| 5,570,333 A | * | 10/1996 | Katayama | 369/112.12 |
| 5,886,964 A | | 3/1999 | Fujita | |
| 6,707,773 B2 | | 3/2004 | Katayama | |

FOREIGN PATENT DOCUMENTS

| | | |
|---|---|---|
| JP | 7093764 | 4/1995 |
| JP | 09-081942 | 3/1997 |
| JP | 2000-298865 | 10/2000 |
| JP | 2001-222833 | 8/2001 |
| JP | 2001-250250 | 9/2001 |
| JP | 2001-307358 | 11/2001 |
| JP | 2002-100063 | 4/2002 |

\* cited by examiner

*Primary Examiner*—Muhammad Edun
(74) *Attorney, Agent, or Firm*—David C. Conlin; David A. Tucker; Edwards Angell Palmer & Dodge LLP

(57) ABSTRACT

An object of the invention is to provide a structure for suppressing occurrence of a track offset in a tracking control using DPP method, and simplified apparatus assembly adjustment. When a diffraction grating provided in an optical pick-up apparatus, diffracts light irradiated from a semiconductor laser at least into zero-order diffraction light and ± first-order diffraction light, disposed adjacent to diffraction area alternately in an extension direction of a grating groove, and an effective diameter of light beam with which the diffraction grating is irradiated is D, and a number of divisions into which the effective diameter D is divided is m (m is an integer of 3 or more), a width W1 and a width W2 are formed to meet W1=W2=D/m.

11 Claims, 27 Drawing Sheets

OPTICAL PICK-UP APPARATUS

BACKGROUND OF THE INVENTION

1. Field of the Invention

The present invention relates to an optical pick-up apparatus which optically records information into an optical recording medium and/or reproduces information from an optical recording medium.

2. Description of the Related Art

Optical disks like Compact Disc (CD), Digital Versatile Disc (DVD), and Mini Disc (MD), etc. are utilized as optical recording media in various fields such as audio video and computer, etc. In accordance with increasing demand of storage capacity, i.e. information volume to be recorded into above mentioned optical recording media, also getting along with narrower track pitch which is a track interval formed on the optical recording medium, information storing area has been expanding to nearly center inside of the optical recording medium.

In an information reproducing apparatus using such an optical recording medium, information are recorded or reproduced by converging a light spot onto information recording surface of the optical recording medium, and by tracking light spots on a track formed in the optical recording medium. A control which tracks light spots on the track is called a tracking control. The tracking control is carried out by detecting a light reflected from the optical recording medium through light receiving elements, and by performing feedback a detected signal from the light receiving elements to an actuator driving an objective lens which is light converging means for converging light onto the optical recording medium. A signal which is used for performing feedback control of driving of the actuator is called a tracking error signal (abbreviated to "TES" hereafter). There is a differential push pull (DPP) method as one of signal generating methods using the tracking error signal.

The DPP method is disclosed in Japanese Unexamined Patent Publication JP-A 7-93764 (1995) for example. FIG. 16 is a simplified schematic diagram showing a structure of a conventional optical pick-up apparatus 1 using the DPP method. An example of a structure of the conventional optical pick-up apparatus 1 is as follows. The optical pick-up apparatus 1 comprises a semiconductor laser 2 as a light source, a collimator lens 3, a diffraction grating 4, a beam splitter 5, a quarter-wavelength plate 6, an objective lens 7, a condensing lens 8, and a photo-detector 9 formed of a light receiving element.

In the optical pick-up apparatus 1, light irradiated from the semiconductor laser 2 is changed to substantially parallel light through the collimator lens 3, diffracted into at least zero-order diffraction light, plus (+) first-order diffraction light and minus (−) first-order diffraction light through the diffraction grating 4, then, transmits the beam splitter 5, transformed into a circularly-polarized light through the quarter-wavelength plate 6, and irradiated onto an optical recording medium 10 after converging light through the objective lens 7.

FIGS. 17A and 17B are views showing a condition of zero-order diffraction light and ±first-order diffraction light which are irradiated on the optical recording medium 10. FIG. 17A shows locations of zero-order diffraction light, + and − (±) first-order diffraction lights irradiated onto the track formed in the optical recording medium 10, and FIG. 17B shows a cross-sectional shape of the optical recording medium 10. The tracking control is carried out so as to irradiate a center of a land part 11 of the track in a width direction in which information should be recorded or which information to be reproduced is recorded (hereinafter maybe the land part 11 is called information track), with a main beam (hereinafter abbreviated to "MB") comprising the zero-order diffraction light. In this occasion, locations which are out of alignment by one half track pitch each toward groove parts 12 and 13 adjacent to both sides of the information track 11 irradiated with the MB are irradiated with a first sub beam (hereinafter abbreviated to "SB1") which is + first-order diffraction light and a second sub beam (hereinafter abbreviated to "SB2") which is − first-order diffraction light.

The MB, SB1, and SB2 with which the optical recording medium 10 is irradiated are reflected by the optical recording medium 10 and again transmitted through the objective lens 7 and the quarter-wavelength plate 6, then reflected by the beam splitter 5, condensed through the condensing lens 8 and received onto the photo-detector 9.

FIG. 18 shows a schematic circuit diagram for obtaining a DPP signal based on detecting signals from the photo-detector 9. The photo-detector 9 comprises photo-detectors 9b, 9c formed of a light receiving element which is divided in two parts so as to have a parting line in a direction parallel to a direction in which a track formed in the optical recording medium 10 extends, and a photo-detector 9a including a light receiving element which divided into quarters so as to have parting lines in a directions parallel to and perpendicular to the track extending direction, under conditions where the optical recording medium 10 is attached facing the optical pick-up apparatus 1.

When an MB push pull signal obtained from an MB receiving light signal detected by the photo-detector 9a and a subtracter 14 is defined as an MPP (Main Push Pull), an SB1 push pull signal obtained from an SB1 receiving light signal detected by the photo-detector 9b and a subtracter 15 is defined as an SPP1 (Sub Push Pull-1), an SB2 push pull signal obtained from an SB2 receiving light signal detected by the photo-detector 9c and a subtracter 16 is defined as an SPP2 (Sub Push Pull-2), a DPP signal which is calculated from a subtracter 19 based on an amplified signal which is further amplified an addition signal SPP (=SPP1+SPP2) obtained from the SPP1, the SPP2 and an accumulator 17, with an amplifier 18 and the MPP is obtained according to the following formula (1).

$$DPP = MPP - k(SPP1 + SPP2) \quad (1)$$

Where a gain k with the amplifier 18 is a coefficient used to compensate the difference of light intensity of zero-order diffraction light and ± first-order diffraction light. When light intensity ratio of each diffraction light is as follows: light intensity of zero-order diffraction light: light intensity of + first-order diffraction light:light intensity of − first-order diffraction light=a:b:b, k is obtained from k=a/(2b).

As above mentioned, locations which are out of alignment by one half track pitch adjacent to both sides from information track 11 irradiated with the MB, are irradiated with the SB1 and the SB2. Therefore, phases of the SPP1 and the SPP2 are out of alignment by 180 degrees against a phase of the MPP, respectively. FIG. 19 is a view showing one example of push pull signals. In FIG. 19, an example is shown in a case where light intensities of the above mentioned diffraction lights are equal to each other, and a=b, i.e. k=0.5. Since light intensities of the SPP1 and the SPP2 are equal to each other, the SPP1 and the SPP2 overlap. Further, since the SPP which multiplies the sum of the SPP1 and the SPP2 by 0.5 is identical with the SPP1 and the SPP2, the SPP1 and the SPP2 overlap. Since the phases of the MPP and the SPP are reverse phases shifted by 180 degrees, the DPP signal is obtained from adding absolute values of amplitudes of the MPP and the SPP.

FIG. 20 is a view showing one example of push pull signals in condition of generating an offset ΔP. Even in a condition where a predetermined track position of the optical recording medium 10 is irradiated with each diffraction light, there is a case where the offset ΔP generates due to a shift of the objective lens or a tilt of the optical recording medium 10. However, even in case where such an offset ΔP generates, since the MPP and the SPP are reverse phases as aforementioned, it is possible to obtain the DPP signal in which the offset ΔP is canceled according to a calculation based on the formula (1).

However, in the conventional DPP method disclosed in JP-A 7-93764, there is a problem that accurate rotation adjustment of a relative position of the diffraction grating 4 with respect to the optical recording medium 10 must be carried out so as to dispose the SB1 and the SB2 to shift by ½ track pitch exactly with respect to the MB. Further, in the conventional DPP method disclosed in JP-A 7-93764, an effect from a track curvature formed in the optical recording medium 10 shown in the above mentioned FIG. 17 is not considered.

FIG. 21 is a view showing a condition of zero-order diffraction light and ± first-order diffraction light with which an optical recording medium 21 is irradiated, with considering a track curvature. As mentioned above, in accordance with increasing demand of storage capacity, nearly to the center inside of the optical recording medium 21 is utilized for information storing and reproducing. Therefore, when signals from the track formed around center area of the optical recording medium 21 is detected, the effect of the track curvature must be considered.

As shown in FIG. 21, when a curvature exists in the track, in case of disposing the SB1, which is a leading beam of the sub beams, into a center of a track groove part 23, it is impossible to dispose the SB2, which is a following beam, into a center of a track groove part 24. In a servo control method using three beams (MB, SB1, SB2) from zero-order diffraction light and ± first-order diffraction lights, it is a common way to dispose SB1 and SB2 on the track groove parts 23 and 24 which are adjacent to both sides of a information track 22 (land part) on which the MB is disposed, respectively. However, there is a problem, as shown in FIG. 21, when a track curvature exists, in case of disposing the MB on the center of the information track 22, that it is impossible to dispose the SB1 in the center of the groove part 23 adjacent to the information track 22, and at the same time to dispose the SB2 in the center of the groove part 24.

FIG. 22 is a view showing an example of a DPP signal obtained based on the detecting signals of the MB, the SB1 and the SB2 with which the track having a track curvature is irradiated. As shown in FIG. 21, in case of an impossibility to dispose the MB on the information track 22, at the same time disposing the SB1 and the SB2 onto the center of the groove part 23 and 24 adjacent to the information track 22, the SPP signal which is a sum signal of the SPP1 and the SPP2 against the MPP has a phase difference. Therefore, another phase difference occurs between the MPP and the DPP which is obtained from the formula (1), and this phase difference becomes a track offset.

On the contrary, in case of disposing the SB2 in the center of the groove part 24, a track offset occurs due to an impossibility of disposing the SB1 in the center of the groove part 23. Further, there is a method for reducing an offset by inverting the phases of the sub beams, i.e., the SB1 and the SB2 against the phase of the MB, and disposing the three beams onto the same track, by contriving a structure of the diffraction grating. However, since there is an isolation distance between the leading and following beams, it is difficult to arrange all of the three beams in the center of the same track when a track curvature exists, and a track offset occurs in the end.

Like this way, when a track curvature exists, even a rotation adjustment for relative positioning against the optical recording medium 21 of the diffraction grating 4 is carried out strictly, it is impossible to eliminate the phase difference between the sum signal SPP of the SB1 and the SB2 and the push pull signal MPP of the MB, and there is a problem that a track offset remains.

Another conventional technique to solve such a problem is disclosed in Japanese Unexamined Patent Publication JP-A 2001-250250 (2001). The description of the technique disclosed in JP-A 2001-250250 is as follows.

FIG. 23 is a simplified schematic diagram showing a structure of the optical pick-up apparatus 25 which is applied with another conventional technique. The optical pick-up apparatus 25 comprises a semiconductor laser 26, a collimator lens 27, a diffraction grating 28, a beam splitter 29, an objective lens 30, a condensing lens 31, and an optical power detector 32 (simplified view) having the same structure with the optical power detector 9. Here, the definitions about X, Y, and Z axes which are three-dimensional coordinate axes shown in FIG. 23. FIG. 24 is a schematic plan view of an optical recording medium 33 from the side of light beams are condensed. Z axis is an axis in an axial direction of light which is irradiated from the semiconductor laser 26 and condensed on an information recording surface of the optical recording medium 33. X axis is an axis provided in an extension direction of a segment 36 which connects the center 34 of the optical recording medium 33 and a focusing position 35 where the light irradiated from the semiconductor laser 26 is focused on the information recording surface of the optical recording medium 33, in a virtual plane perpendicular to Z axis. Accordingly, the X axis direction is called a radial direction, since this axis corresponds to the radial direction of the optical recording medium 33. Y axis is an axis extending in direction perpendicular to X axis, in the virtual plane perpendicular to Z axis. Accordingly, there is an occasion that the Y axis direction is called a track direction, since this axis corresponds to a tangential direction of a track formed in the optical recording medium 33. These definitions according to three axis directions are used in the specification in common.

FIG. 25 is a top plan view showing a structure of the diffraction grating 28 (patterning) provided in the conventional optical pick-up apparatus 25. In the diffraction grating 28, a quartered area part 37 which is obtained in case of cutting into quarters equally by parting lines which are parallel to X and Y axis directions respectively, is formed so as to be different from the remaining area part 38 other than the quartered area part 37. In the diffraction grating 28 shown in FIG. 25, the quarter area 37 is formed in a lower right corner on top plan view. The quarter area part 37 and the remaining part 38 are structured in uniform with respect to a grating groove direction and a grating groove interval. However, since pitches between the grating groove intervals are located out of alignment only one half each other, in a phase of a light which transmits the quarter area part 37, 180 degrees phase difference is added in relation to a phase of a light which transmits the area part 38 except for the quarter part.

FIG. 26 is a view showing the TES in case of using the diffraction grating 28. In a case where a light beam 39, transmits the diffraction grating 28, is diffracted into the MB, the SB1 and the SB2, further reflected by the optical recording medium 33, and received by the optical power detector 32, the area of the diffraction light having 180 degrees phase difference against the beam irradiating area is substantially equal to the area of the diffraction light which has no connection with the phase difference against the beam irradiating area with respect to the light receiving element receiving the SB1 and the SB2, i.e. ± first-order diffraction lights, i.e., a light receiving amount of the diffraction light having the phase difference is substantially equal to that of the diffraction light having no connection with the phase difference. Therefore, the diffraction lights having 180 degrees phase difference with respect to each other are canceled, and the amplitudes of the SPP1 and the SPP2 of the push pull signals from the sub beams SB1 and SB2 will become substantially zero.

In the meantime, with respect to the offset occurring due to the shift of the objective lens 30, it is possible to cancel in accordance with the calculation of the above mentioned formula (1). As described above, in the other conventional optical pick-up apparatus 25, by making the amplitudes of the SPP1 and the SPP2 of the push pull signals from the SB1 and the SB2 substantially zero, the reduction of the track offset occurring due to a rotation adjustment error of the diffraction grating 28 is realized.

However, in the other conventional optical pick-up apparatus 25, when the quarter area part 37 which adds 180 degrees phase difference of the diffraction grating 28 generates a deviation in X and/or Y axis direction which is perpendicular to the optical axial direction against the light beam 39, a phenomenon occurs that an amplitude ratio increases according to increase of deviation amount. Here, the amplitude ratio means a ratio of an amplitude of the push pull signal SPP1, SPP2 by the SB1 or the SB2 against an amplitude of the push pull signal MPP by the MB (i.e., SPP1/MPP or SPP2/MPP).

FIG. 27 is a view showing a relationship between the deviation amount and the amplitude amount. In FIG. 27, the amplitude ratio of the amplitude of the SPP1 against the amplitude of the MPP (SPP1/MPP) is exemplified. In FIG. 27, line 40 shows the change of amplitude ratio in case of occurring the deviation in X axis (radial) direction, and line 41 shows the change amplitude ratio in case of occurring the deviation in Y axis (track) direction. With respect to the diffraction grating 28 having the patterning shown in the FIG. 25, in case of occurring the deviation in Y axis direction, an increasing sensitivity to the amplitude ratio is higher than a case of occurring the deviation in X axis direction.

Accordingly, in the other conventional optical pick-up apparatus 25, there is a problem that the track offset generates when the deviation with a rotation position adjustment of the diffraction grating 28 occurs in a condition where the phase difference addition area part 37 causing the deviation in X axis direction and/or Y axis direction so that the amplitude ratio increases, i.e., in a condition where the amplitude of push pull signals SPP1 and SPP2 from the SB1 and the SB2 are large. In other words, in the optical pick-up apparatus 25 using the diffraction grating 28 which adds a phase difference to part of the light beam 39, there is also a problem that high precision is required with respect to the rotation position adjustment of the diffraction grating 28.

Further, generally, in the optical pick-up apparatus, the diffraction grating is attached to a cylindrical holder having a rotating axis, because the rotation adjustment of the diffraction grating must be carried out in order to arrange the MB, the SB1 and the SB2 into the target positions on the optical recording medium. When the holder is attached to the diffraction grating, in a case where an error generates between the center of the diffraction grating and the rotating axis of the holder, this condition equally corresponds to a condition where the deviation in X axis direction and/or Y axis direction occurs at an area part which adds the phase difference to the light beam. Therefore, when the rotation position of the diffraction grating is adjusted, the amplitudes of push pull signals SPP1, SPP2 by the SB1 and the SB2 increase, which causes a track offset occurrence.

SUMMARY OF THE INVENTION

An object of the invention is to provide an optical pick-up apparatus which can reduce track offset occurring in a tracking control using DPP method by a simple structure, and which can simplify an assembly adjustment of the apparatus.

The invention provides an optical pick-up apparatus which optically records information into an optical recording medium and/or reproduces information from an optical recording medium, comprising:

a light source for irradiating light;

a collimator lens for changing the light irradiated from the light source to a substantially parallel light;

a diffraction grating for diffracting the light irradiated from the light source at least to zero-order diffraction light, plus (+) first-order diffraction light and minus (−) first-order diffraction light, and for providing a phase difference to part of the + and − (±) first order diffraction light;

light converging means for converging the zero-order diffraction light and the ± first order diffraction light onto the optical recording medium;

light separating means, disposed between the light source and the light converging means, for transmitting and reflecting the zero-order diffraction light and the ± first order diffraction light; and light detecting means including a plurality of light receiving elements, for receiving the zero-order diffraction light and the ± first order diffraction light reflected by the optical recording medium, wherein in the diffraction grating, a diffraction area which provides a phase difference to the ±first order diffraction light and a diffraction area which provides no phase difference to the ± first order diffraction light are alternately disposed adjacent to each other in an extension direction of a grating groove, and wherein the diffraction grating is formed so that a width W1 which is a length of a diffraction area which provides a phase difference in the extension direction of the grating groove and a width W2 which is a length of a diffraction area which provides no phase difference in the extension direction of the grating groove, meet the following formula (W1=W2=D/m), where D denotes an effective diameter of a light beam irradiated from the light source and irradiates to the diffraction grating, and m denotes a number of divisions into which the effective diameter D of the light beam is equally divided in a grating groove direction (m is an integer of 3 or more).

According to the invention, the light irradiated from the light source is diffracted at least to the zero-order diffraction light and the ±first order diffraction light, and with respect to the diffraction grating which provides a phase difference to part of the ±first order diffraction light, the diffraction area which provides a phase difference to the ±first order diffraction light and the diffraction area which provides no phase difference to the ±first order diffraction light, are alternately disposed adjacent to each other in the extension direction of the grating groove. When the effective diameter of the light beam irradiated from the light source and irradiates to the diffraction grating is D, and the number of divisions into which the effective diameter D of the light beam is equally divided in the grating groove direction is m (m is an integer of 3 or more), the diffraction gating is formed so that both of the width W1 which is a length of the diffraction area providing a phase difference in the extension direction of the grating groove and the width W2 which is a length of the diffraction area which provides no phase difference in the extension direction of the grating groove are equal to D/m.

With respect to the diffraction grating formed in this way, the diffraction area which provides a phase difference to the ± first order diffraction light and the diffraction area which provides no phase difference are included substantially equally inside of the effective diameter D of the light beam which transmits the diffraction grating. Thereby, with respect to push pull signals detected from a first sub beam SB1 which is + first-order diffraction light, and a second sub beam SB2 which is − first-order diffraction light which are diffracted by the diffraction grating, by the light detecting means, respectively, light from the diffraction area which provides a phase difference and light from the diffraction area which provides no phase difference are canceled each other. Accordingly, regardless of the existing positions of the first sub beam SB1 and the second sub beam SB2 on a track of the optical recording medium, push pull signals from the first sub beam SB1 and the second sub beam SB2 are signals having substantially constant variation characteristics. Since, regardless the existing positions of the first sub beam SB1 and the second sub beam SB2 on the track of the optical recording medium, push pull signals having approximately constant variation characteristics is available, there is no need to implement a rotation adjustment with the diffraction grating so as to be arranged in the center of the track with respect to the first sub beam SB1 and the second sub beam SB2 in together, and a significant simplification of an apparatus assembly adjustment is realized.

Further, the plurality of the diffraction area which provides a phase difference to the ± first-order diffraction light and the diffraction area which provides no phase difference to the ± first-order diffraction light are alternately arranged adjacent to each other in the extension direction of the grating groove so as to have equal width W1=W2 (=D/m), respectively. Therefore, even if the diffraction grating is deviated in X axis direction and/or Y axis direction, a patterning of the diffraction grating included in the effective diameter D of the light beam with which the diffraction grating is irradiated is an identical shape, and there is no change with respect to light intensity of the ±first-order diffraction light. Thereby, an increase of the amplitude of push pull signals from the first sub beam SB1 and the second sub beam SB2 of the ±first-order diffraction light is prevented, and an occurrence of a track offset is suppressed.

Further in the invention, it is preferable that a plurality of the diffraction gratings are adjacent to each other in a direction perpendicular to the extension direction of the grating groove, and that the diffraction gratings adjacent to each other are arranged so as to shift by the width W1 (=W2) in the extension direction of the grating groove, and that, when a number of divisions into which the effective diameter D of the light beam is equally divided in the direction perpendicular to the grating groove direction is n (n is an integer of 2 or more), a height H which is a length in the direction perpendicular to the extension direction of the grating groove of the diffraction grating, meets the following formula (H=D/n).

According to the invention, the plurality of the diffraction gratings are adjacent to each other in the direction perpendicular to the extension direction of the grating groove, and the diffraction gratings adjacent to each other are alternately arranged so as to shift by the width W1 (=W2) in the extension direction of the grating groove. Since the height H which is the length in the direction perpendicular to the extension direction of the grating groove for each diffraction grating, is set to be equal with a quotient (D/n) which is obtained by dividing the effective diameter D of the light beam number by the number of divisions n (n is an integer of 2 or more) into which the effective diameter D of the light beam is equally divided in the direction perpendicular to the grating groove direction. Therefore, at least 2 or more of the diffraction gratings which are alternately disposed so as to shift by the width W1 (=W2) are included inside of the effective diameter D of the light beam with which the diffraction grating is irradiated. Thereby, with respect to push pull signals detected by light detecting means from the first sub beam SB1 and the second sub beam SB2 respectively, light from the diffraction area which provides a phase difference and light from the diffraction area which does not provide a phase difference, are canceled each other more certainly. Therefore, the amplitude of the push pull signal is substantially zero, and the occurrence of the track offset is suppressed. Further, there will be no need to implement the rotation adjustment of the diffraction grating, and a significant simplification of the apparatus assembly adjustment is realized.

Further in the invention, it is preferable that the diffraction grating is disposed between the light source and the collimator lens.

According to the invention, since there is no need to implement a position adjustment or a rotation adjustment and an application in a case where the effective diameter D of the light beam irradiated from the light source is small is possible, the diffraction grating may be disposed between the light source and the collimator lens. By arranging the diffraction grating between the light source and the collimator lens, the apparatus assemble adjustment is simplified, and the size of the apparatus is further smaller.

Further in the invention, it is preferable that the optical pick-up apparatus further comprises grating moving means for moving the diffraction grating in a direction parallel to an axis of light irradiated from the light source.

According to the invention, the grating moving means for moving the diffraction grating in the direction parallel to the axis of light irradiated from the light source. By moving the diffraction grating in the optical axis direction by the grating moving means, it is possible to select a position where the amplitude of the push pull signal from the ±first-order diffraction light can be made substantially zero. Thereby, it is possible to dispose the diffraction grating in a preferable position in the optical axis direction so as to suppress the track offset to the minimum value.

Further in the invention, it is preferable that the diffraction grating is attached adjacent to a side of the light separating means which side is closer to the light source.

Further in the invention, it is preferable that the diffraction grating is formed on a side of the light separating means which side is closer to the light source, and the diffraction grating is integrated with the light separating means as a single part.

According to the invention, the diffraction grating is attached adjacent to the side of the light separating means which side is closer to the light source, or formed by integrating as a single part with the light separating means on a side thereof closer to the light source. Thereby, since it is possible to eliminate a holder for holding the diffraction grating, the reduction of the parts number is possible and it is possible to contribute to the downsizing of the apparatus.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
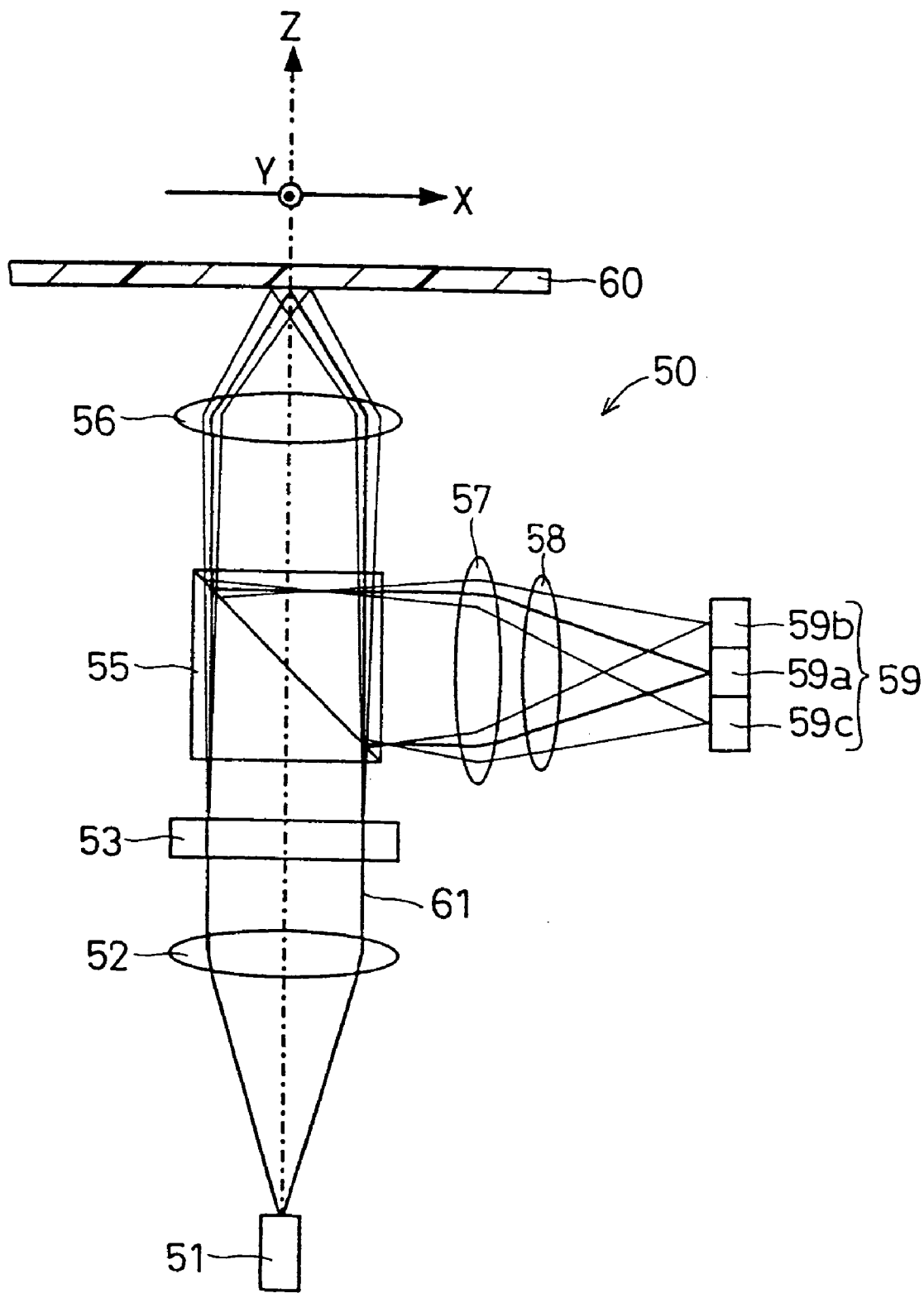
FIG. 1 is a simplified schematic diagram showing a structure of an optical pick-up apparatus according to one embodiment of the invention.

Now referring to the drawings, preferred embodiments of the invention are described below.

FIG. 1 is a simplified schematic diagram showing a structure of an optical pick-up apparatus 50 according to one embodiments of the invention. The optical pick-up apparatus 50 comprises a semiconductor laser 51 as a light source, a collimator lens 52, a diffraction grating 53, a beam splitter 55 as light separating means, an objective lens 56 as light converging means, for converging light irradiated from the semiconductor laser 51 onto an optical recording medium 60, a reflection light condensing lens 57 for condensing reflected light by the optical recording medium 60, a cylindrical lens 58, light detecting means 59 composed of a plurality of light receiving elements. With respect to X-Y-Z system three-dimensional coordinate axes shown in the FIG. 1 and the subsequent figures, as mentioned above, X axis is in a radial direction, Y axis is in a track direction, and Z axis is in an optical axis direction.

The semiconductor laser 51 is a compound semiconductor containing the group III element and the group V element specified in the periodic table of elements, and the semiconductor laser 51 can oscillate a laser light. The collimator lens 52 changes light irradiated from the semiconductor laser 51 to substantially parallel light.

Figure 2:
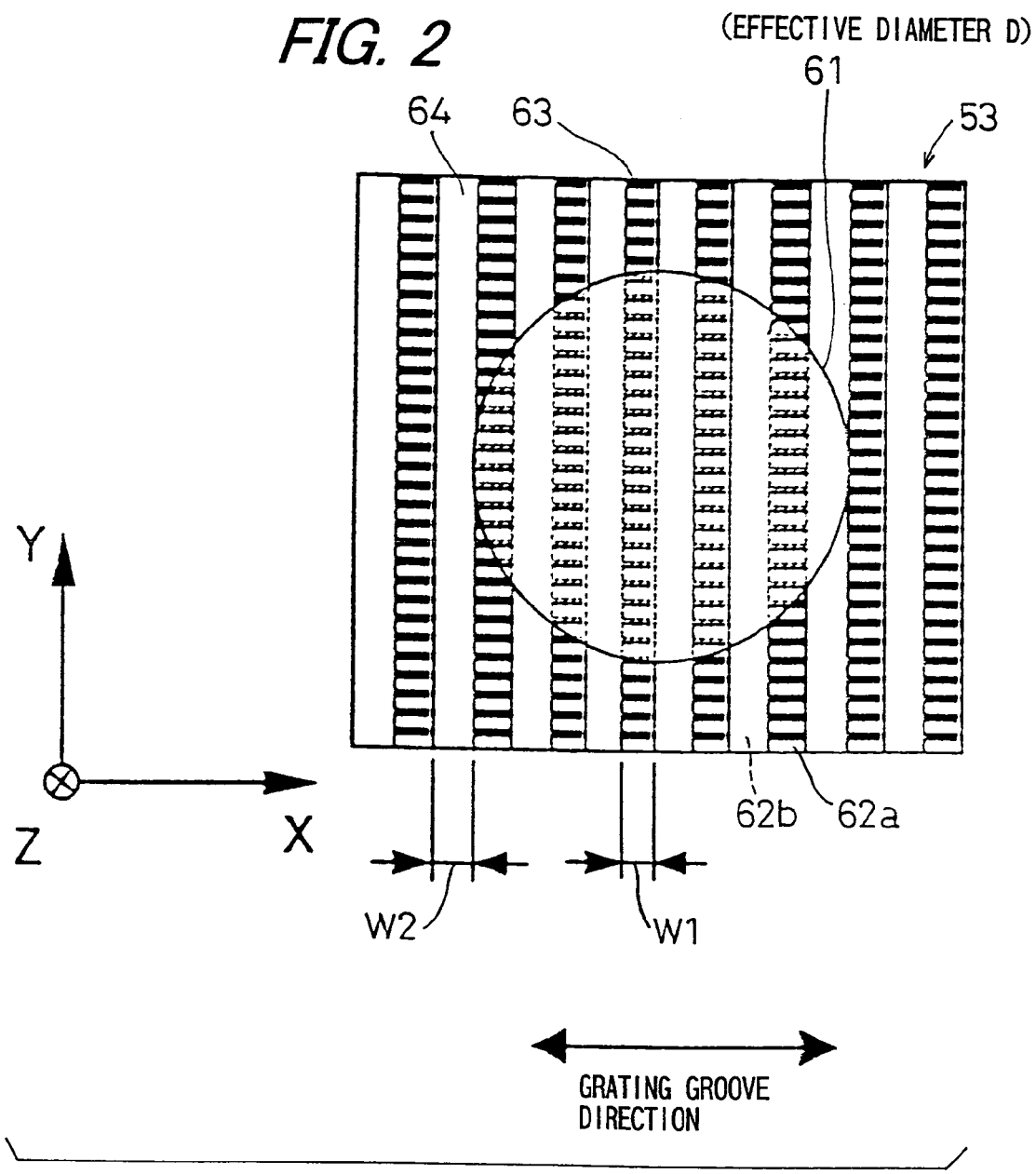
FIG. 2 is a plan view showing a structure of the diffraction grating provided with an optical pick-up apparatus.

The diffraction grating 53 diffracts at least to zero-order diffraction light, + first-order diffraction light and − first-order diffraction light, by transmitting light beam 61 irradiated from the semiconductor laser 51. FIG. 2 is a plan view showing a structure of the diffraction grating 53 provided in the optical pick-up apparatus 50. Referring to FIG. 2, a structure of the diffraction grating 53 is described in the following.

The diffraction grating 53 is a flat grating having grating grooves 62a, 62b extending in X axis (radial) direction. The light is diffracted by reflection and interference in transmitting the grating grooves 62a and 62b. In the diffraction grating 53, a diffraction area 63 which provides a phase difference to the ± first-order diffraction light, and a diffraction area 64 which provides no phase difference to the ± first-order diffraction light are arranged alternately adjacent to each other in an extension direction of the grating groove 62a and 62b. In case of an effective diameter of the light beam 61 which is irradiated from the semiconductor laser 51 and with which the diffraction grating 53 is irradiated is D, and a number of divisions into which the effective diameter D of the light beam 61 is equally divided in the grating groove direction is m (m is an integer of 3 or more: m=10 in the embodiment of the invention), the diffraction grating 53 is formed so that a width W1 which is a length of the diffraction area 63 which provides a phase difference in the extension direction of the grating groove 62a and 62b, and a width W2 which is a length of diffraction area 64 which provides no phase difference in the extension direction of the grating grooves, meet the following formula (W1=W2=D/m).

Meanwhile, in FIG. 2, the grating groove 62b in the diffraction area 64 which provides no phase difference is omitted to avoid a too detailed figure. However, the grating groove 62b is structured in the same way with the grating groove 62a, except for grating groove intervals are formed so as to shift by half pitch against the grating groove 62a. Thereby, the diffraction light, from the diffraction area 63 which provides a phase difference, is given 180 degrees phase difference against the diffraction light from the diffraction area 64 which does not provide a phase difference.

The diffraction area 63 which provides a phase difference of the diffraction grating 53, and the diffraction area 64 which provides no phase difference are not only formed inside of the effective diameter D of the light beam 61, but also formed outside of the effective diameter D of the light beam 61. In other words, the surface of the diffraction grating which meets the said structural requirements and formed to have a flat area larger than the effective diameter D of the light beam 61, is irradiated with the light beam 61.

Here, the effective diameter D of the light beam 61 corresponds to a light flux diameter which is utilized by the objective lens. However, in a case where an optical system having an effect of a reduction or an enlargement between the objective lens and collimator lens exists, the effective diameter D on the diffraction grating is obtained by dividing the light flux diameter by a magnification of the optical system. For example, in a case where the light flux diameter which is utilized with the objective lens is φ3 mm, and a magnification between the objective lens and the collimator lens is 2, the effective diameter D on the diffraction grating is φ1.5 mm (=φ3 mm/2). In the embodiment of the invention, a magnification between the objective lens and the collimator lens is 1.

Again referring to FIG. 1, the beam splitter 55 as light separating means is located between the semiconductor laser 51 and the optical recording medium 60 so as to allow a light irradiated from the semiconductor laser 51 to transmit and so as to reflect a reflection light reflected by the optical recording medium 60.

Figure 21:
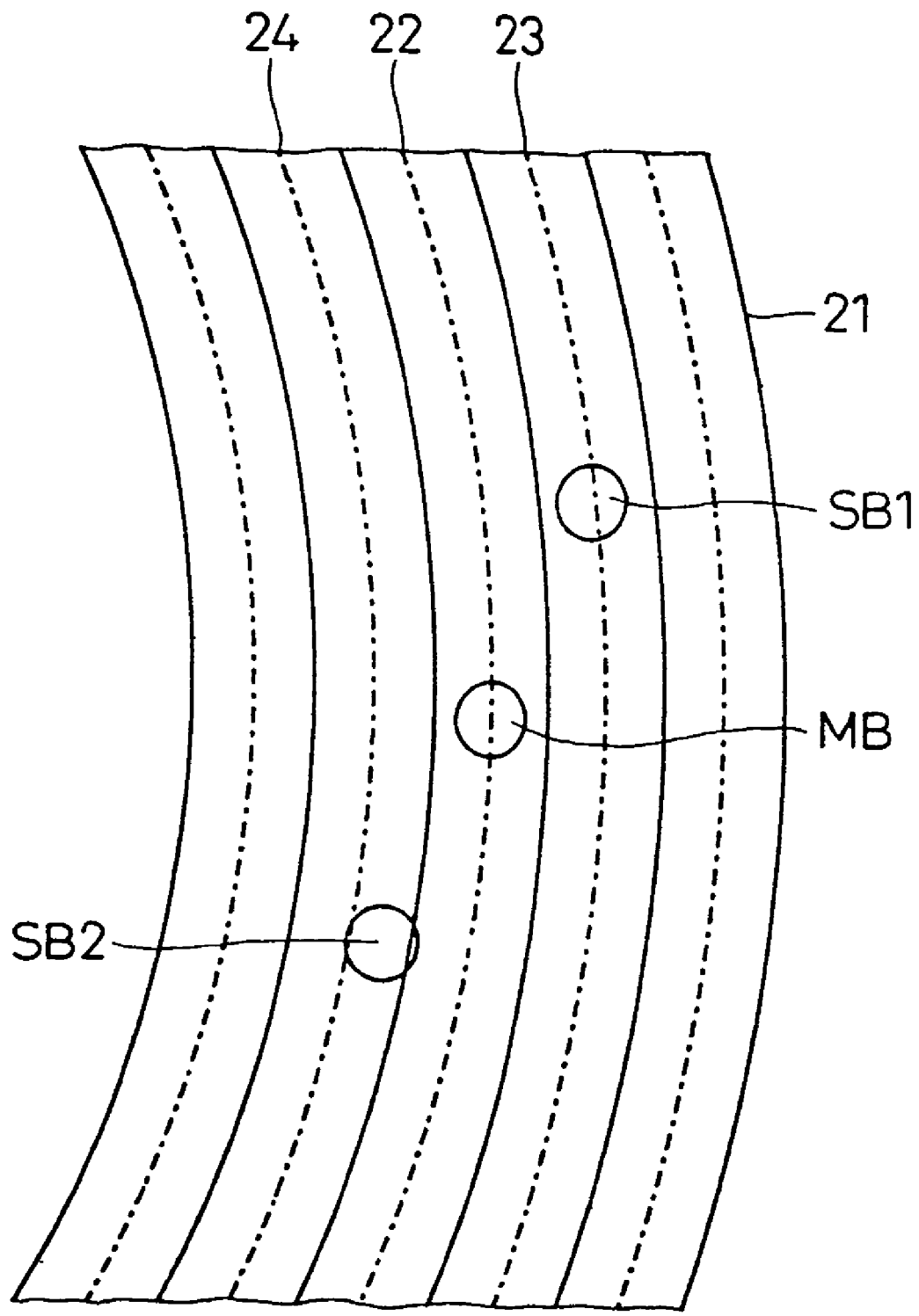
FIG. 21 is a view showing zero-order diffraction light and ±first-order diffraction light with which an optical recording medium in which a track curvature is considered, is irradiated.
Figure 22:
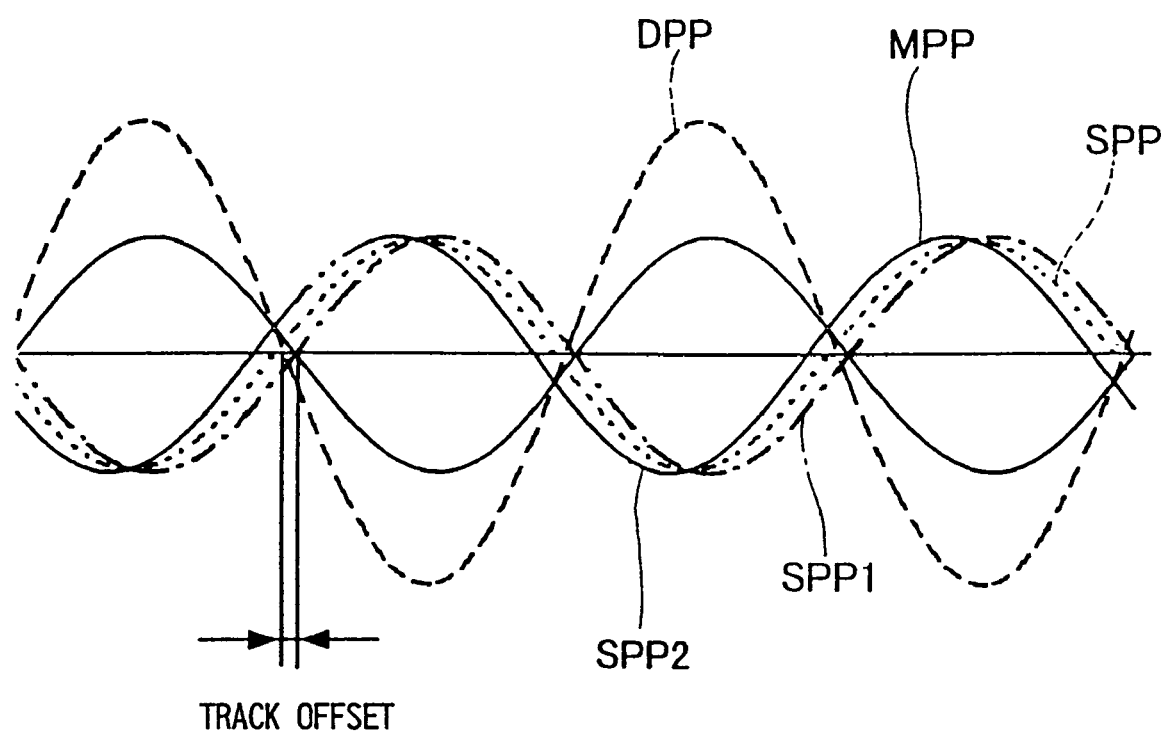
FIG. 22 is a view showing an example of a DPP signal which is obtained based on the detecting signals of MB, SB1 and SB2 with which tracks having a curvature is irradiated.
Figure 23:
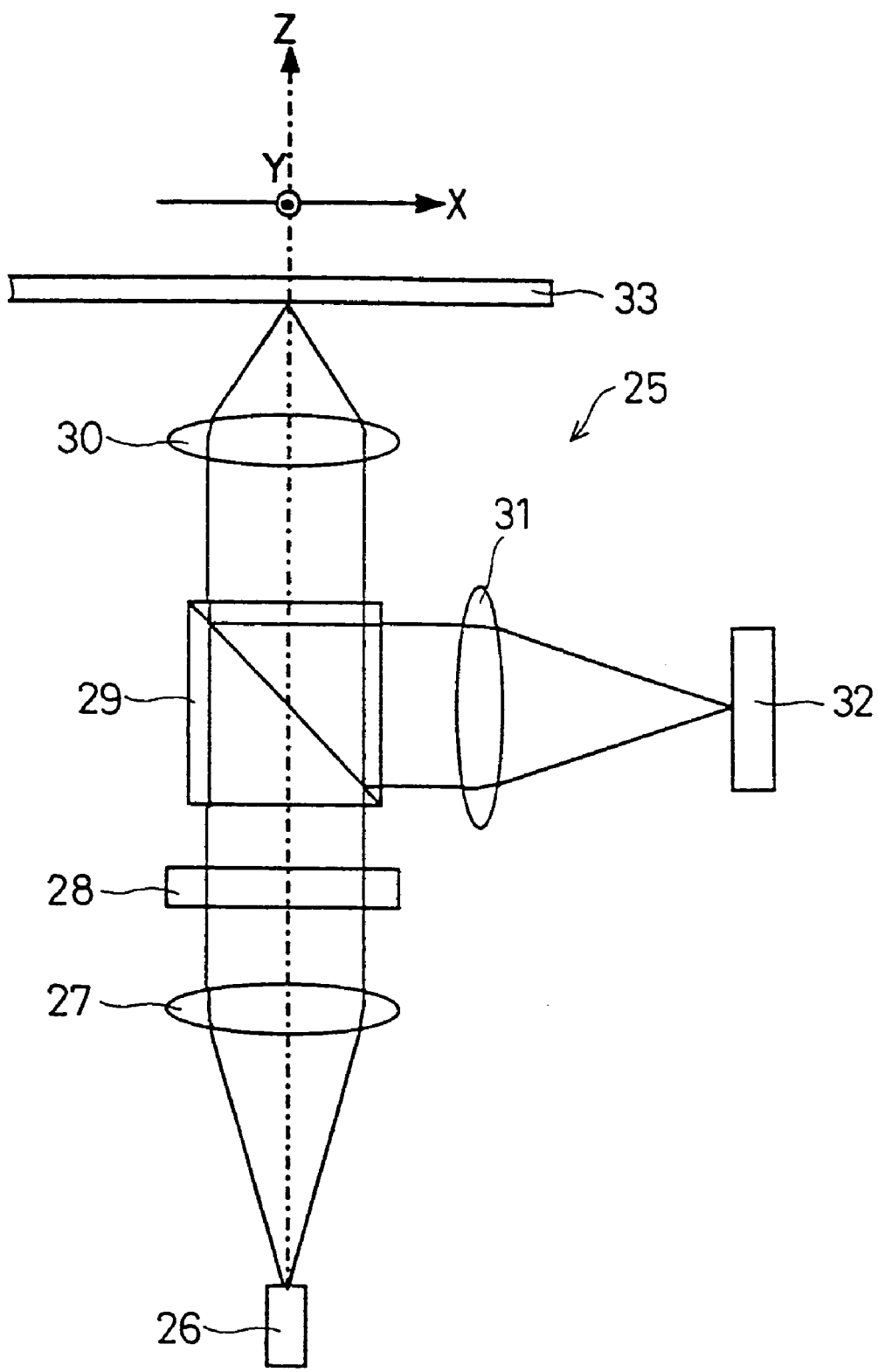
FIG. 23 is a simplified schematic diagram showing a structure of another conventional optical pick-up apparatus.
Figure 24:
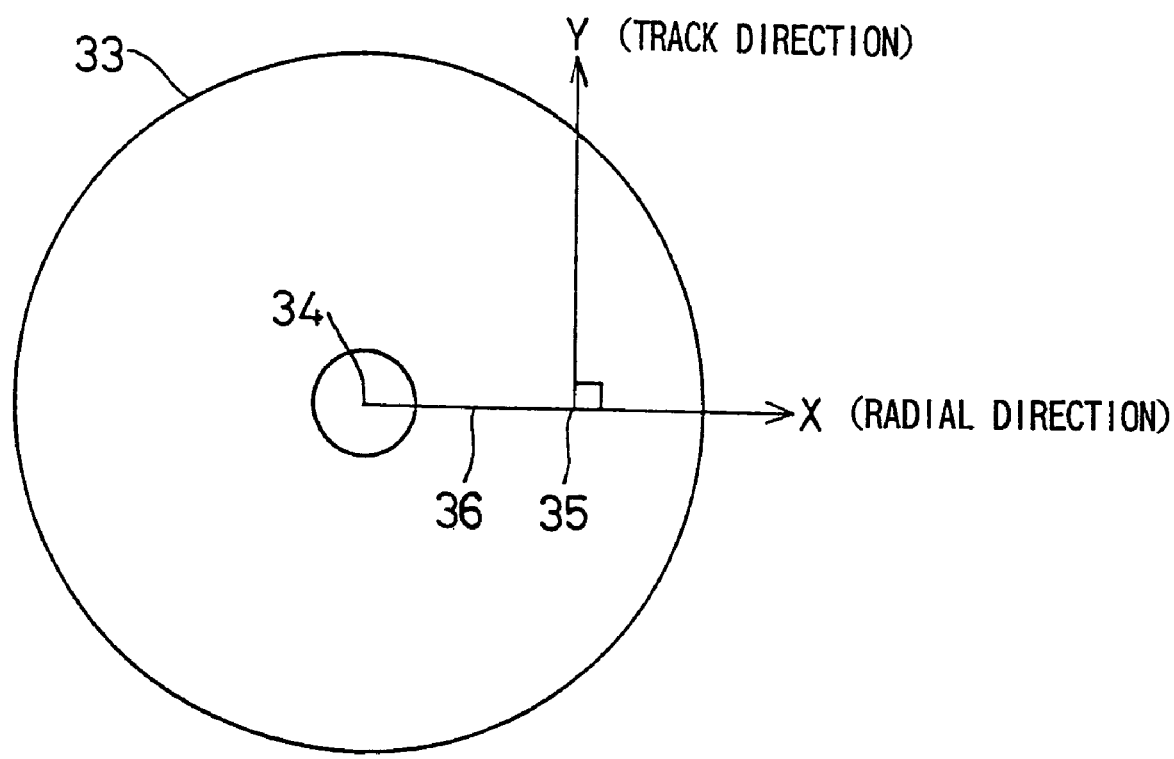
FIG. 24 is a schematic plan view of an optical recording medium from a side of light beam being focused.
Figure 25:
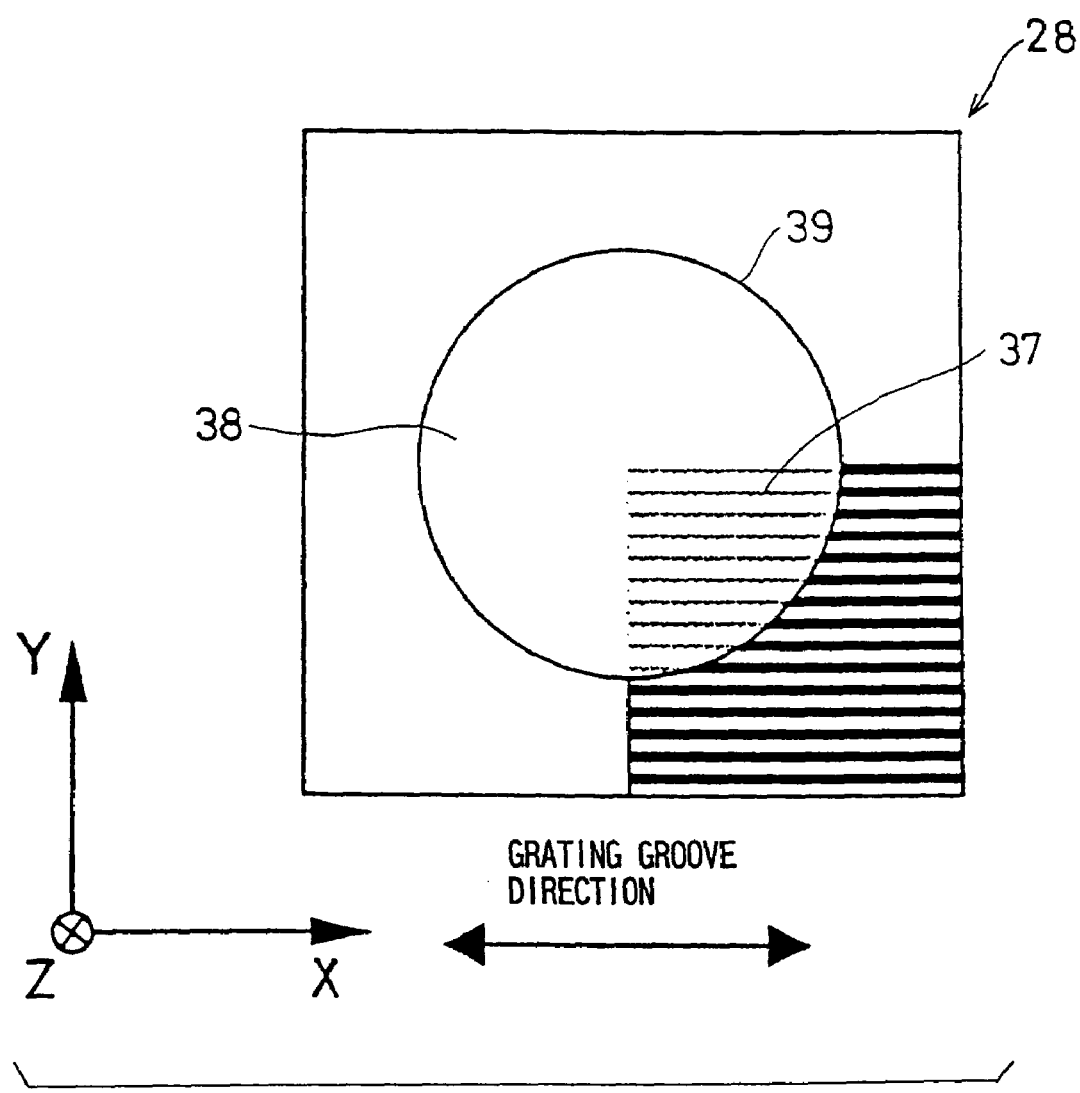
FIG. 25 is a schematic plan view showing a structure of a diffraction grating (patterning) provided in the conventional optical pick-up apparatus.
Figure 26:
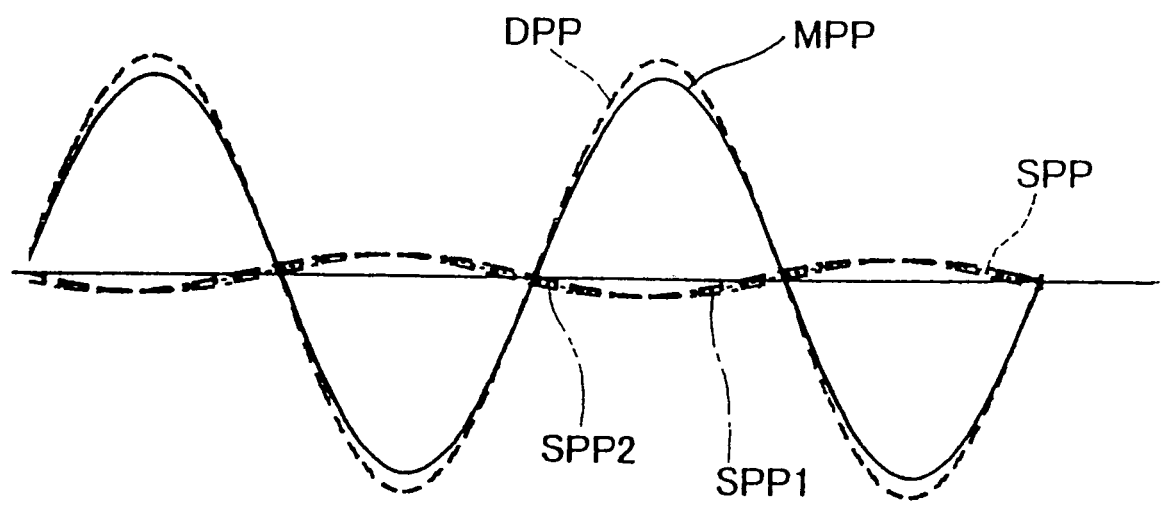
FIG. 26 is a view showing a TES in case of using the diffraction grating.
Figure 27:
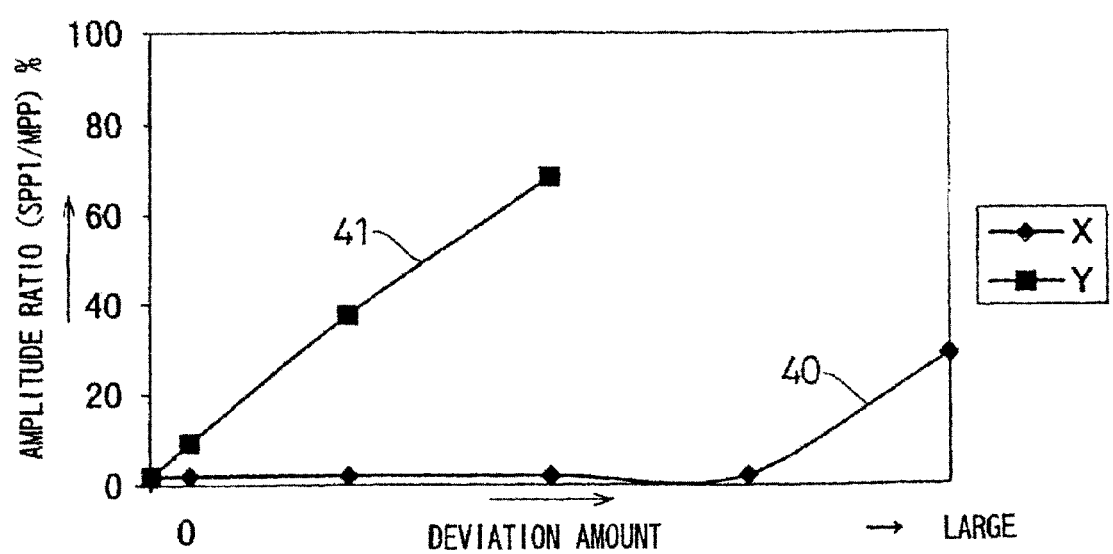
FIG. 27 is a view showing a relationship between a deviation amount and an amplitude ratio.

The objective lens 56 focuses zero-order diffraction light and ± first-order diffraction light transmitted the beam splitter 55, on the track forming on an information recording surface of the optical recording medium 60. In the embodiment, a center of a information track (land part) is irradiated with the zero-order diffraction light as a main beam (MB), and groove parts adjacent to the information track are irradiated with + first-order diffraction light as a first sub-beam (SB1) and − first-order diffraction light as a second sub-beam (SB2), respectively. However, since a track curvature on the optical recording medium 60 is taken into a consideration, a relative location among the MB, the SB1 and the SB2 is, as shown in the FIG. 21, in a condition where the MB is located on the center of the information track, whereas the SB1 and the SB2 can not be located on the respective centers of the groove parts adjacent to the information track. In the embodiment, the information track is the land part, however, recording and reproducing may be made on the groove part.

The MB, the SB1 and the SB2 which are reflected by the optical recording medium 60, transmits the objective lens 56 again, are reflected by the beam splitter 55, and are incident on the reflection light condensing lens 57. The MB, the SB1 and the SB2 which are focused by transmitting the reflection light condensing lens 57 are provided with an astigmatism for an out-of-focus detection by the cylindrical lens 58, and are detected with respect to the amount of received light by the light detecting means 59.

The light detecting means 59 is a light detecting apparatus composed of a plurality of light receiving elements comprising photodiodes. The light detecting means 59 comprises a first photodetector 59a which is composed of four light receiving elements which are divided by parting lines in parallel with X axis direction and Y axis direction, respectively, and a second photodetector 59b and a third photodetector 59c which are composed of two light receiving elements which are divided by a parting line in parallel with Y axis (track) direction.

The first photodetector 59a detects the MB. A push pull signal obtained based on a light receiving signal of the MB detected by the first photodetector 59a is defined as MPP. The second photodetector 59b detects the SB1. A push pull signal obtained based on a light receiving signal of the SB1 detected by the second photodetector 59b is defined as SPP1. Further, the third photodetector 59c detects the SB2. A push pull signal obtained based on a light receiving signal of the SB2 detected by the third photodetector 59c is defined as SPP2. A DPP signal which is used as TES can obtain according to the formula (1) from MPP, SPP1 and SPP2. Meanwhile, a sum signal of the push pull signals from sub beams is shown as SPP.

Figure 3:
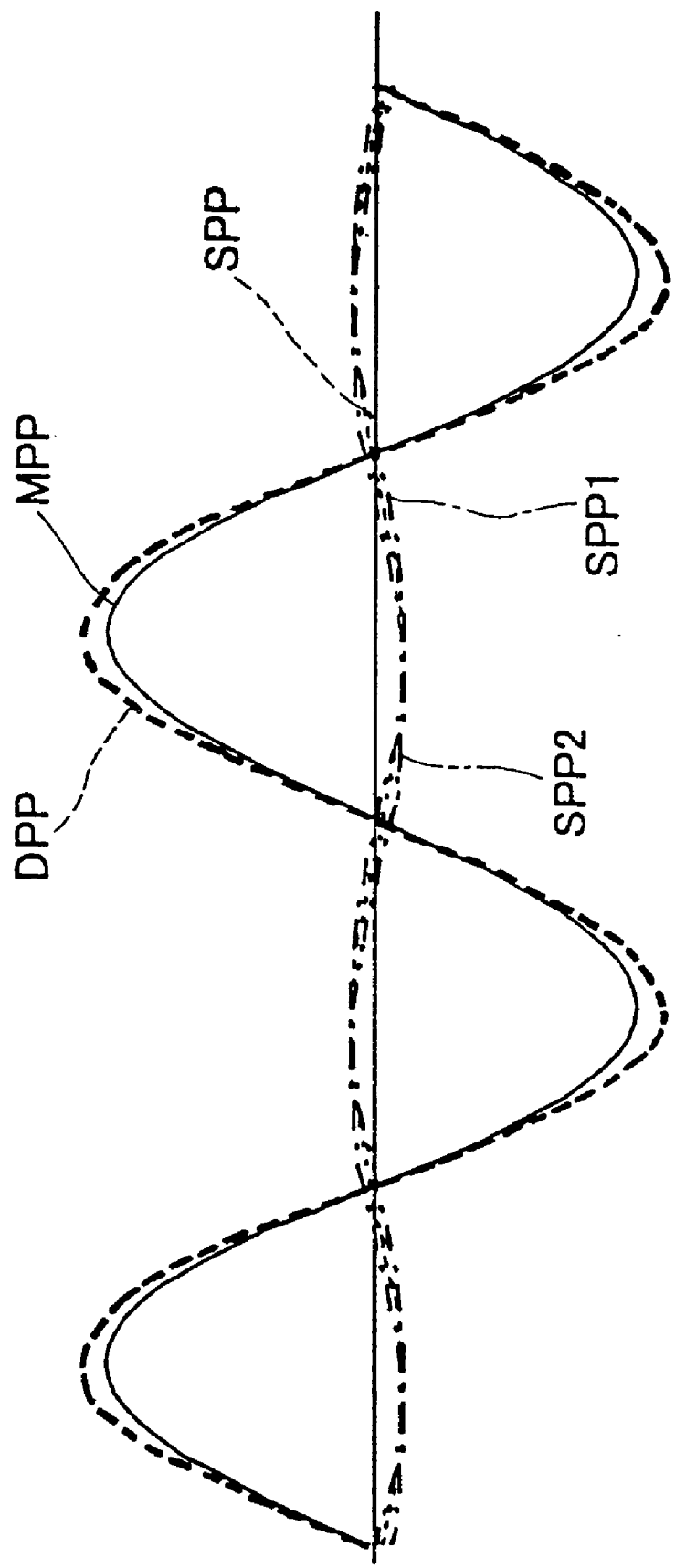
FIG. 3 is a diagram exemplifying push pull signals obtained from an optical pick-up apparatus according to the embodiment of the invention.

FIG. 3 is a diagram exemplifying the push pull signals obtained from the optical pick-up apparatus 50 according to the embodiment of the invention. As shown in FIG. 3, an amplitude of the SPP1 and the SPP2 which are the push pull signals of the SB1 and the SB2 respectively, is smaller than that of the MPP which is the push pull signal of the MB. This is because, in the SB1 and the SB2, 180° phase difference between light transmitted the diffraction area 63 which provides the phase difference and light transmitted the diffraction area 64 which provides no phase difference is given when the light is diffracted by the diffraction grating 53. With respect to the SB1 and the SB2, a beam cross-sectional area which transmits the diffraction area 63 which provides the phase difference, and a beam cross-sectional area which transmits the diffraction area 64 which provides no phase difference, are substantially identical with each other. Therefore, the light which is transmitted the diffraction area 63 which provides the phase difference and the light which is transmitted the diffraction area 64 which provides no phase difference are canceled by having 180° phase difference, when light is diffracted by the diffraction grating 53, further reflected by the optical recording medium 60, and received by the second and third photodetectors 59b and 59c.

Thereby, the amplitude of the SPP1 and the SPP2 which are the push pull signals of the SB1 and the SB2 respectively become smaller, and the SPP1 and the SPP2 become signals having substantially constant variation characteristic regardless existing positions of the SB1 and the SB2 on the track of the optical recording medium 60. Thus, in the optical pick-up apparatus 50, the push pull signals having substantially constant variation characteristic is obtained regardless existing positions of the SB1 and the SB2 on the track of the optical recording medium 60. Therefore, there is no necessity to adjust a rotation position of the diffraction grating 53 so as to the SB1 and the SB2 are located on the center of the track, and significant simplification for controlling apparatus assembling is realized.

Figure 4:
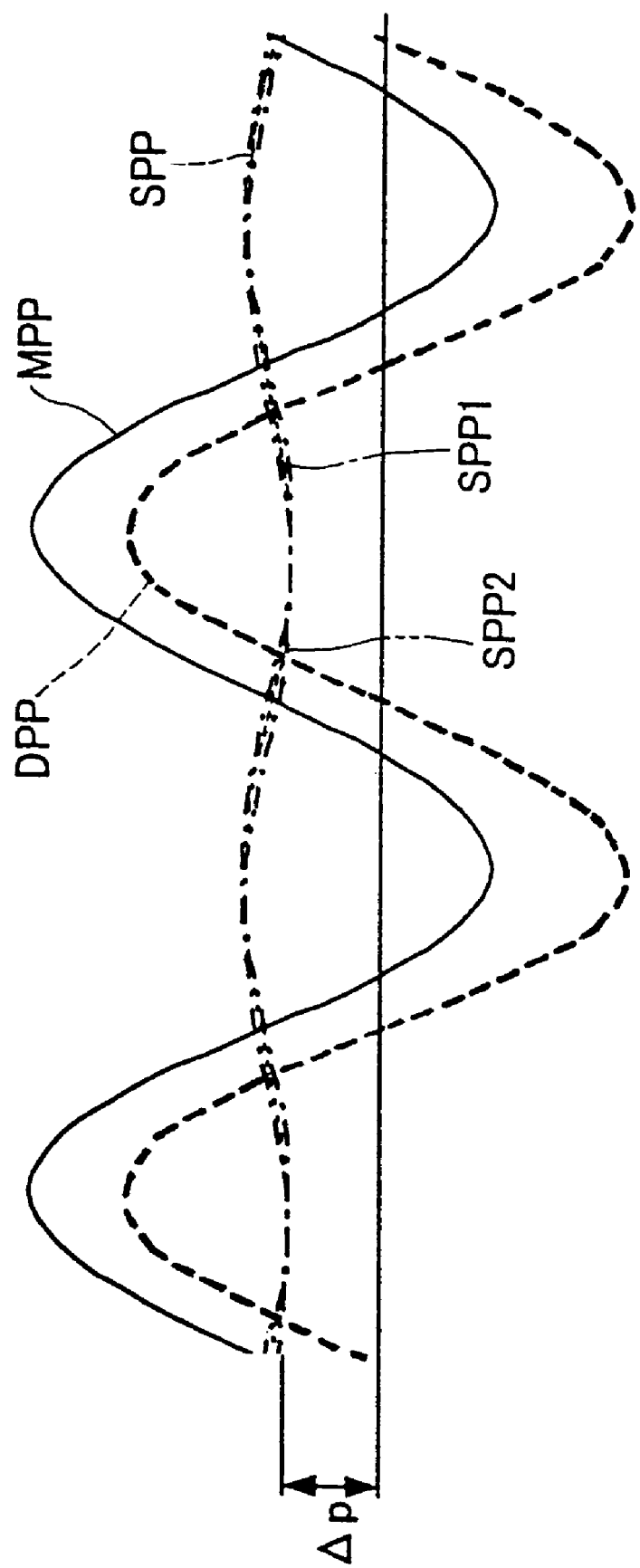
FIG. 4 is a diagram exemplifying push pull signals generating offset ΔP obtained from an optical pick-up apparatus according to the embodiment of the invention.

FIG. 4 is a diagram exemplifying the push pull signals generating an offset ΔP obtained from the optical pick-up apparatus 50 according to the embodiment of the invention. FIG. 4 shows TES which is in a condition generating an offset ΔP due to a shift of the objective lens or a tilt of the optical recording medium 60, in the optical pick-up apparatus 50 according to the embodiment of the invention. When the offset ΔP is generated at the same side (the same phase) corresponding to each amount of light of the MB, the SB1 and the SB2 due to occurrence of the shift of the objective lens or the tilt of the optical recording medium 60, TES (=DPP) in which the offset ΔP is canceled is obtained from the calculation according to the formula (1), in the optical pick-up apparatus 50. Here, a coefficient k which is used for the formula (1) is to compensate the difference of the light intensity between the zero-order diffraction light and the ±first-order diffraction light as the same aforementioned. When each light intensity ratio is, zero-order diffraction light:+ first-order diffraction light:− first-order diffraction light=a:b:b, a/(2b) is obtained. The SPP in FIG. 4 means a signal which multiplies the coefficient (SPP1+SPP2) by k.

Figure 5:
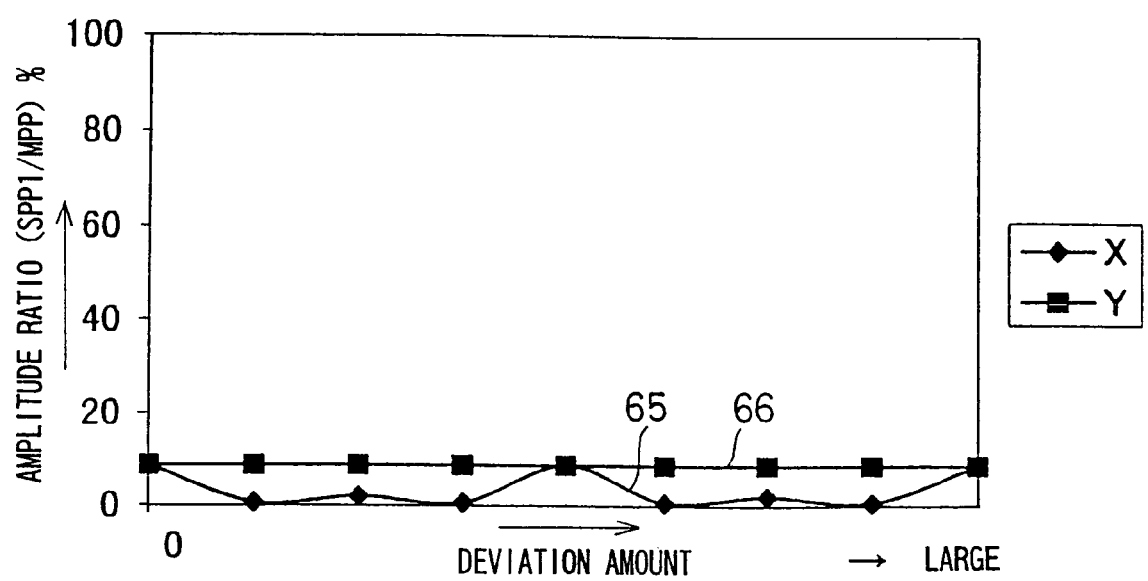
FIG. 5 is a diagram showing a relationship between a deviation amount and an amplitude ratio in a case where a relative deviation between the light beam and the diffraction grating occurs.

FIG. 5 is a diagram showing a relationship between a deviation amount and an amplitude ratio in a case where a relative deviation between the light beam 61 and the diffraction grating 53 occurs. FIG. 5 shows the relationship between the deviation amount and the amplitude ration (SPP1/MPP), in a case where a deviation of the diffraction grating 53 against the light beam 61 occurs in X or Y axis direction within a plane perpendicular to Z axis. In FIG. 5, a line 65 represents an amplitude ratio in a case where the deviation occurs in X axis direction, and a line 66 represents an amplitude ratio in a case where a deviation occurs in Y axis direction. In addition, although FIG. 5 shows the amplitude ratio (SPP1/MPP), with respect to an amplitude ratio (SPP2/MPP) of SPP2, the same tendency is shown.

In the optical pick-up apparatus 50, even if the deviation of the diffraction grating 53 against the light beam 61 in X or Y axis direction has occurred, the amplitude ratio (SPP1/MPP) is suppressed to a small value less than 10% in percentage.

Even if the deviation of the diffraction grating 53 against the light beam 61 occurs, the amplitudes of the push pull signals SPP1 and SPP2 from the SB1 and the SB2 respectively are suppressed smaller. Therefore, occurrence of track offset is prevented without a strict adjustment of the rotation position of the diffraction grating 53 so that the SB1 and the SB2 are placed in a predetermined position on the track of the optical recording medium 60.

This is for the following reason. The diffraction area 63 which provides the phase differences to the SB1 and the SB2, and the diffraction area 64 which provides no phase differences to the SB1 and the SB2, are adjacent alternately to each other in an extension direction of the grating groove 62a and 62b where direction the grating grooves have an equal width W1=W2, respectively, ten diffraction areas 63 and 64 (i.e., m=10) is included within the effective diameter D of the optical light beam 61, and a light beam irradiated area of the diffraction grating 53 is formed larger than the effective diameter D of the light beam 61. Therefore, even if deviation of the diffraction grating 53 occurs in X axis direction and/or Y axis direction, a patterning of the diffraction grating 53 included inside of the effective diameter of the light beam 61 with which the diffraction grating 53 is irradiated is the same shape as that of the diffraction grating 53 in a case where no deviation of the diffraction grating 53 occurs, and no change of the light intensity of the SB1 and the SB2 occurs.

Figure 6:
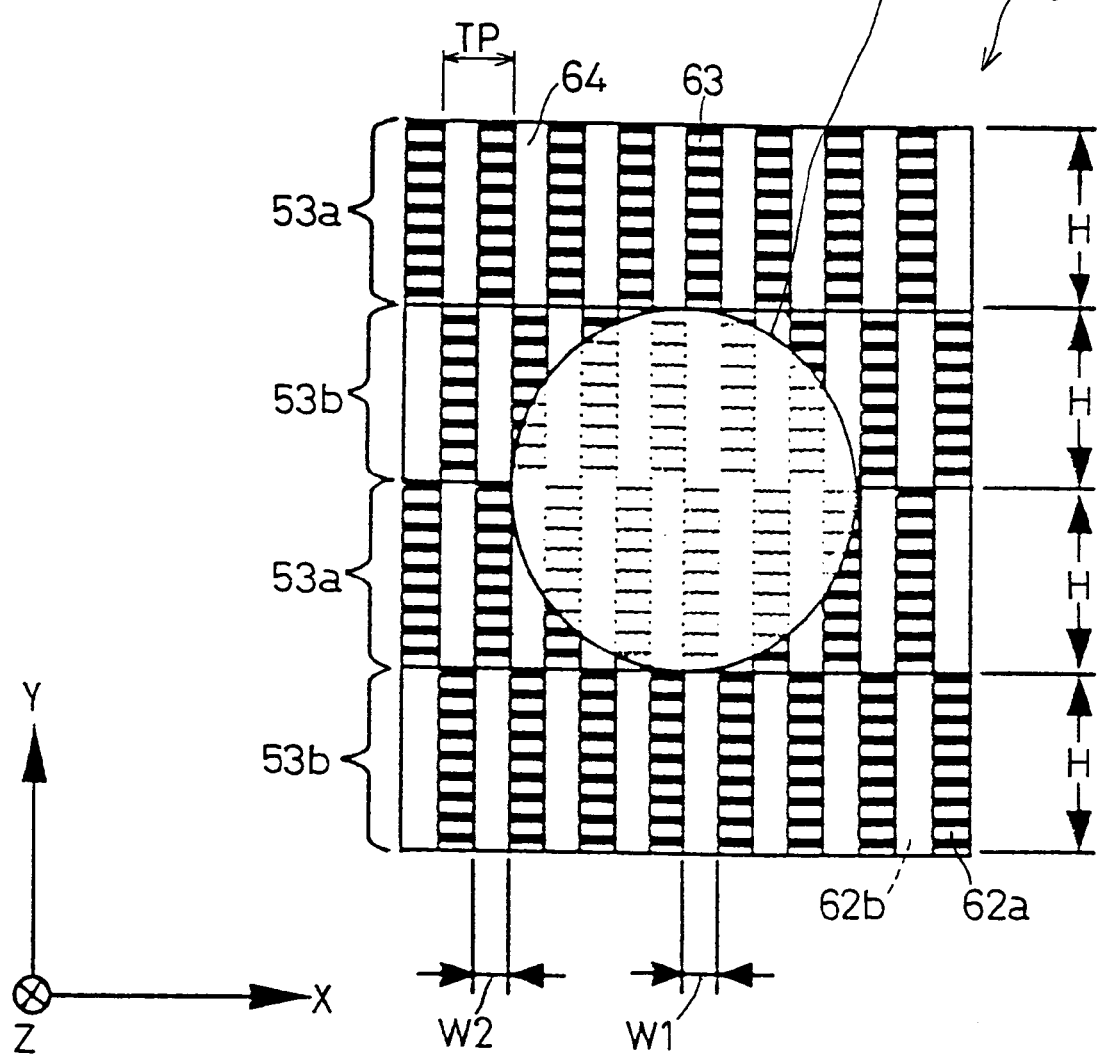
FIG. 6 is a simplified plan view of a structure of a diffraction grating provided in an optical pick-up apparatus according to a second embodiment of the invention.

FIG. 6 is a simplified plan view showing a structure of a diffraction grating 70 provided in an optical pick-up apparatus according to a second embodiment of the invention. The optical pick-up apparatus according to the embodiment of the invention is structured in the same way with the optical pick-up apparatus 50 according to the first embodiment of the invention, except the diffraction grating 70 is used instead of the diffraction grating 53. Therefore, a figure thereof is omitted. Further, the diffraction grating 70 of the embodiment of the invention is similar to the diffraction grating 53 of the first embodiment of the invention. Accordingly, The same components as those described before will be denoted by the same reference numerals, and a repetition of a description thereof will be omitted. Further, with respect to the diffraction grating 70 shown in FIG. 6, the grating groove 62b is omitted to avoid too detailed figure as the diffraction grating 53 shown in FIG. 2.

The diffraction grating 70 comprises two kinds of diffraction gratings 53a and 53b which has the same structure as the diffraction grating according to the first embodiment of the invention. In other words, the diffraction grating 70 comprises the diffraction grating 53a and 53b formed so as to shift by ½ taxo-pitch alternately (TP/2) in X axis direction of the diffraction area 63 which provides a phase difference and the diffraction area 64 which provides no phase difference. The half-pitch (TP/2) which is a shift amount is equal to the width W1 (=W2) of the diffraction area 63 which provides a phase difference and the diffraction area 64 which provides no phase difference. In the embodiment, two pieces each diffraction grating 53a and diffraction grating 53b, i.e., total 4 pieces are prepared, and these are structured so as to be arranged alternately adjacent to each other in Y axis direction. A height H which is a length of each diffraction grating 53a and 53b forming the diffraction grating 70 in Y axis direction, is set to meet H=D/n, when a number of divisions is n (n is an integer of 2 or more: n=2 in the embodiment) into which the effective diameter D of the light beam 61 is equally divided in Y axis direction perpendicular to the grating groove direction.

With respect to an optical pick-up apparatus provided with the diffraction grating 70, at least two or more of diffraction grating 53a and 53b which are arranged so as to shift by a width W1 (=W2) alternately, is contained inside of the effective diameter D of the light beam 61 with which the diffraction grating 70 is irradiated. Thereby, with respect to the push pull signals SPP1 and SPP2 which are detected by the second and third photo-detectors 59b and 59c from the SB1 and the SB2 respectively, the amplitude of the push pull signals SPP1 and SPP2 is made substantially zero, and the occurrence of the track offset is suppressed, since light from the diffraction area 63 which provides a phase difference and light from the diffraction area 64 which provides no phase difference is canceled each other more certainly.

Figure 7:
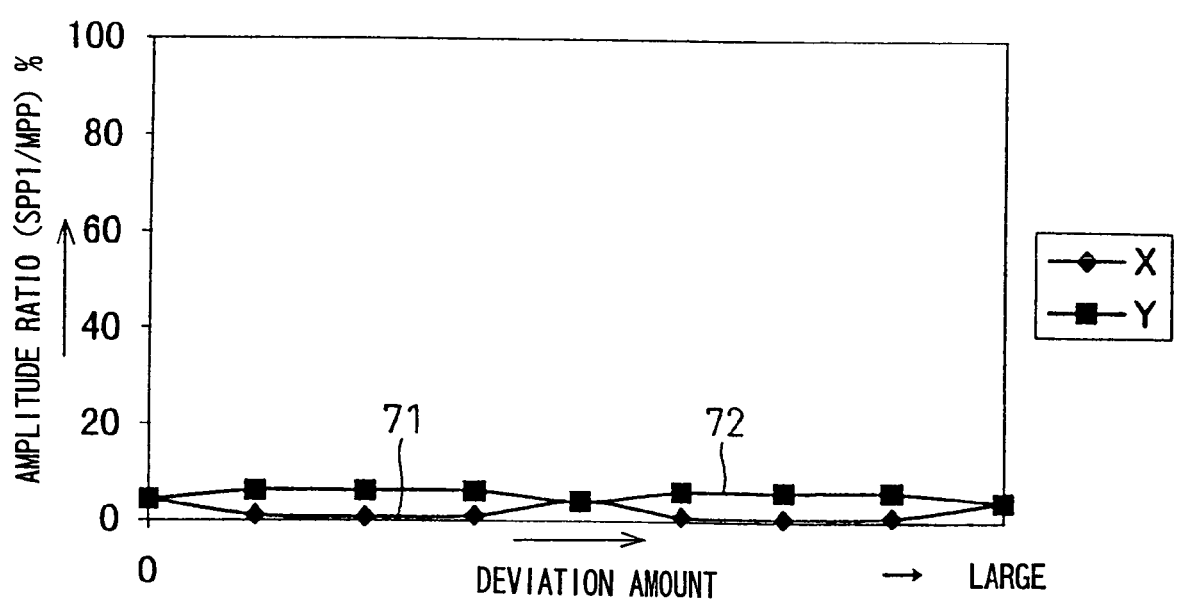
FIG. 7 is a diagram showing a relation between a deviation amount and an amplitude ratio in a case where a relative deviation between the light beam and the diffraction grating occurs.

FIG. 7 is a diagram showing a relationship between a deviation amount and an amplitude ratio in a case where a relative deviation between the beam 61 and the diffraction grating 70 occurs. FIG. 7 shows the relationship between the deviation amount and the amplitude ratio (SPP1/MPP) in a case where the deviation of the diffraction grating 70 against the light beam 61 occurs in X or Y axis direction, within a plane perpendicular to Z axis. In FIG. 7, a line 71 represents an amplitude ratio in a case where the deviation occurs in X axis direction, and a line 72 represents an amplitude ratio in case where the deviation occurs in Y axis direction. With respect to the diffraction grating 70 provided in an optical pick-up apparatus according to the embodiment of the invention, even if the deviation against the light beam 61 occurs, the amplitude ratio (SPP1/MPP) is suppressed to a smaller value, in comparison with the case of the diffraction grating 53 provided in the optical pick-up apparatus 50 according to the first embodiment shown in the FIG. 5. Thus, by suppressing the amplitude of the SPP1 and the SPP2 to substantially zero, there is no necessity to adjust a rotation of the diffraction grating 70, and a significant simplification of an assembly adjustment is realized.

Figure 8:
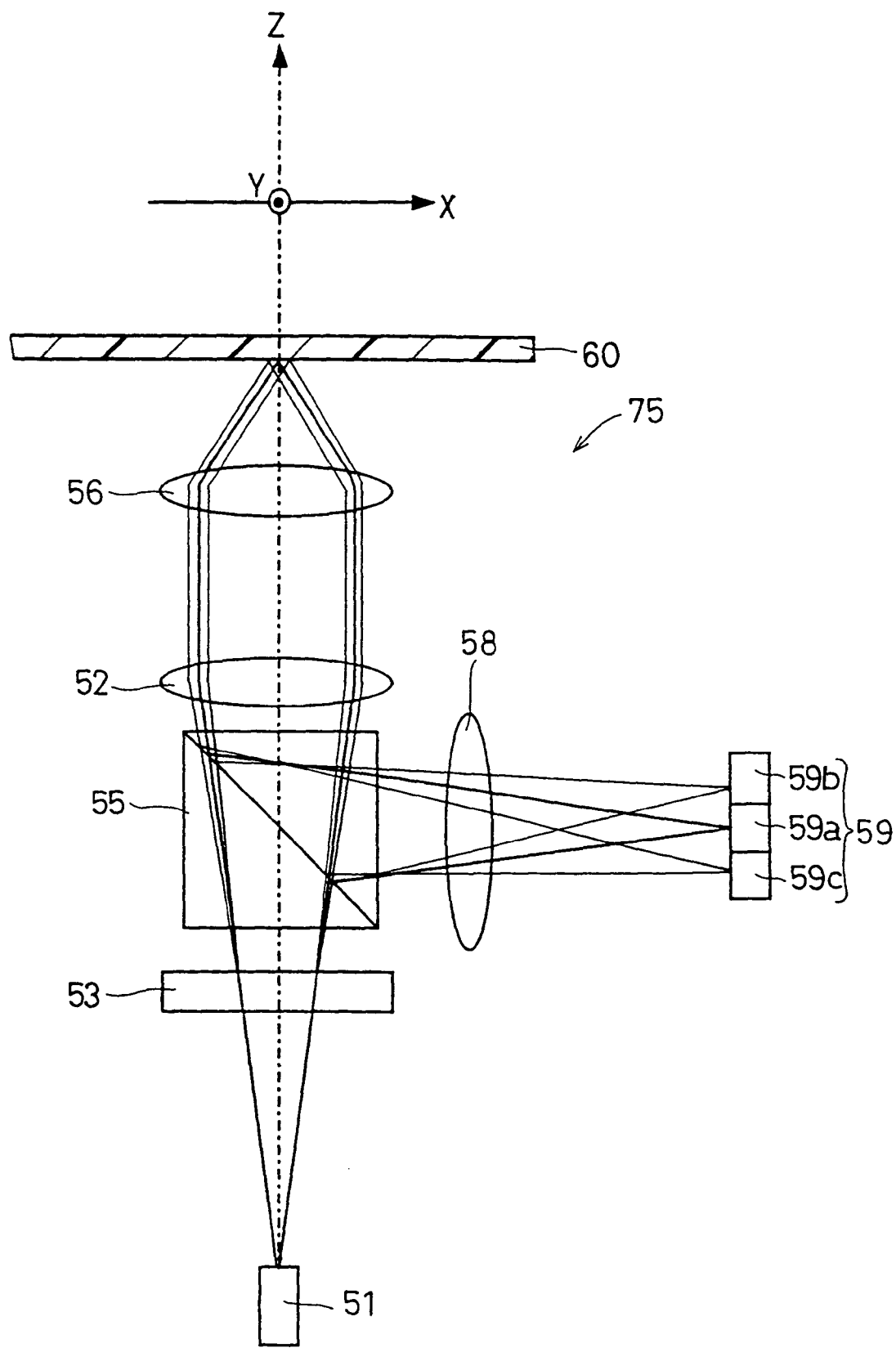
FIG. 8 is a simplified schematic diagram showing a structure of an optical pick-up apparatus according to a third embodiment of the invention.

FIG. 8 is a simplified schematic diagram showing a structure of the optical pick-up apparatus 75 according to a third embodiment of the invention. Since the optical pick-up apparatus 75 according to the embodiment of the invention, is similar to the optical pick-up apparatus 50 according to the first embodiment of the invention. Therefore, the same components as those described before will be denoted by the same reference numerals, and a repetition of a description thereof will be omitted. A remarkable point of the optical pick-up apparatus 75 is that the diffraction grating 53 is arranged between the semiconductor laser 51 and the collimator lens 52. In the optical pick-up apparatus 50 according to the first embodiment of the invention, since the collimator lens 52 is arranged between the semiconductor laser 51 and the diffraction grating 53, light which is substantially in parallel by the collimator lens 52 and has a large effective light converging diameter, is incident on the diffraction grating 53. However, the optical pick-up apparatus 75 according to the embodiment of the invention is arranged so that light having a small effective light converging diameter prior to transmitting the collimator lens 52 is incident on the diffraction grating 53.

In a case where the diffraction grating is arranged in light having a small effective light converging diameter, a pattern of the diffraction grating must be smaller than a case where the diffraction grating is arranged in parallel light having a large effective light converging diameter, in order to make amplitudes smaller of the push pull signals SPP1 and SPP2 from the SB1 and the SB2. When the pattern of the diffraction grating is made small, a strict relative position adjustment between the diffraction grating and the light beam is necessary. However, since the optical pick-up apparatus 75 according to the embodiment of the invention provides the diffraction grating 53, even if the light having a small effective light converging diameter is incident, it is possible to suppress the amplitudes of the push pull signals SPP1 and SPP2 from the SB1 and the SB2, and to suppress a track offset occurrence.

Figure 9:
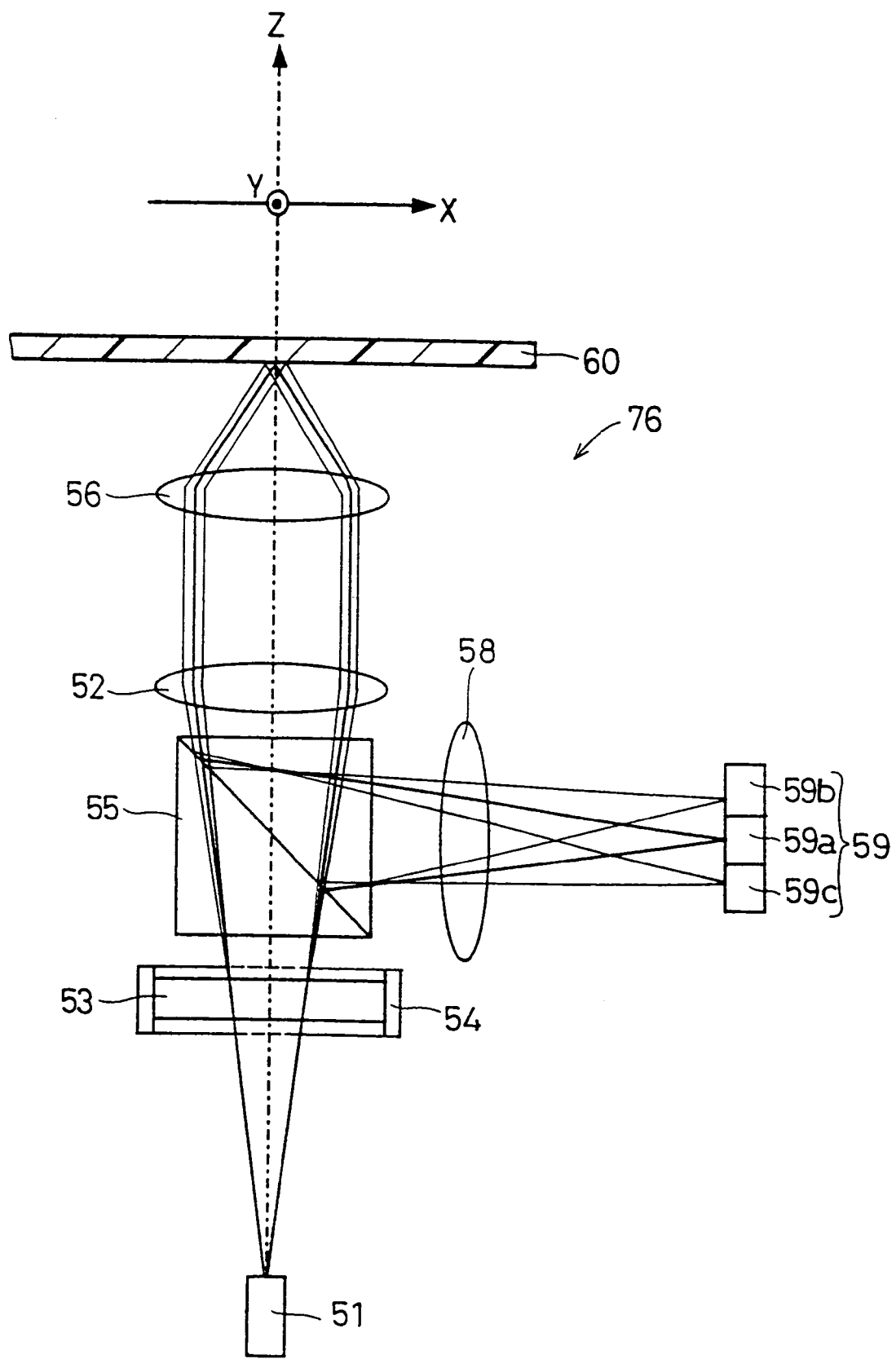
FIG. 9 is a simplified schematic diagram showing a structure of an optical pick-up apparatus according to a fourth embodiment of the invention.

FIG. 9 is a simplified schematic diagram showing a structure of an optical pick-up apparatus 76 according to a forth embodiment of the invention. The optical pick-up apparatus 76 is similar to the optical pick-up apparatus 75 according to the third embodiment of the invention. Accordingly, the same components as those described before will be denoted by the same reference numerals, and a repetition of a description thereof will be omitted. A remarkable point of the optical pick-up apparatus 76 is that the optical pick-up apparatus 76 includes a diffraction moving means 54 which moves the diffraction grating 53 in Z axis direction, i.e., a direction parallel with an axis of a light irradiated from the semiconductor laser 51.

Figure 10:
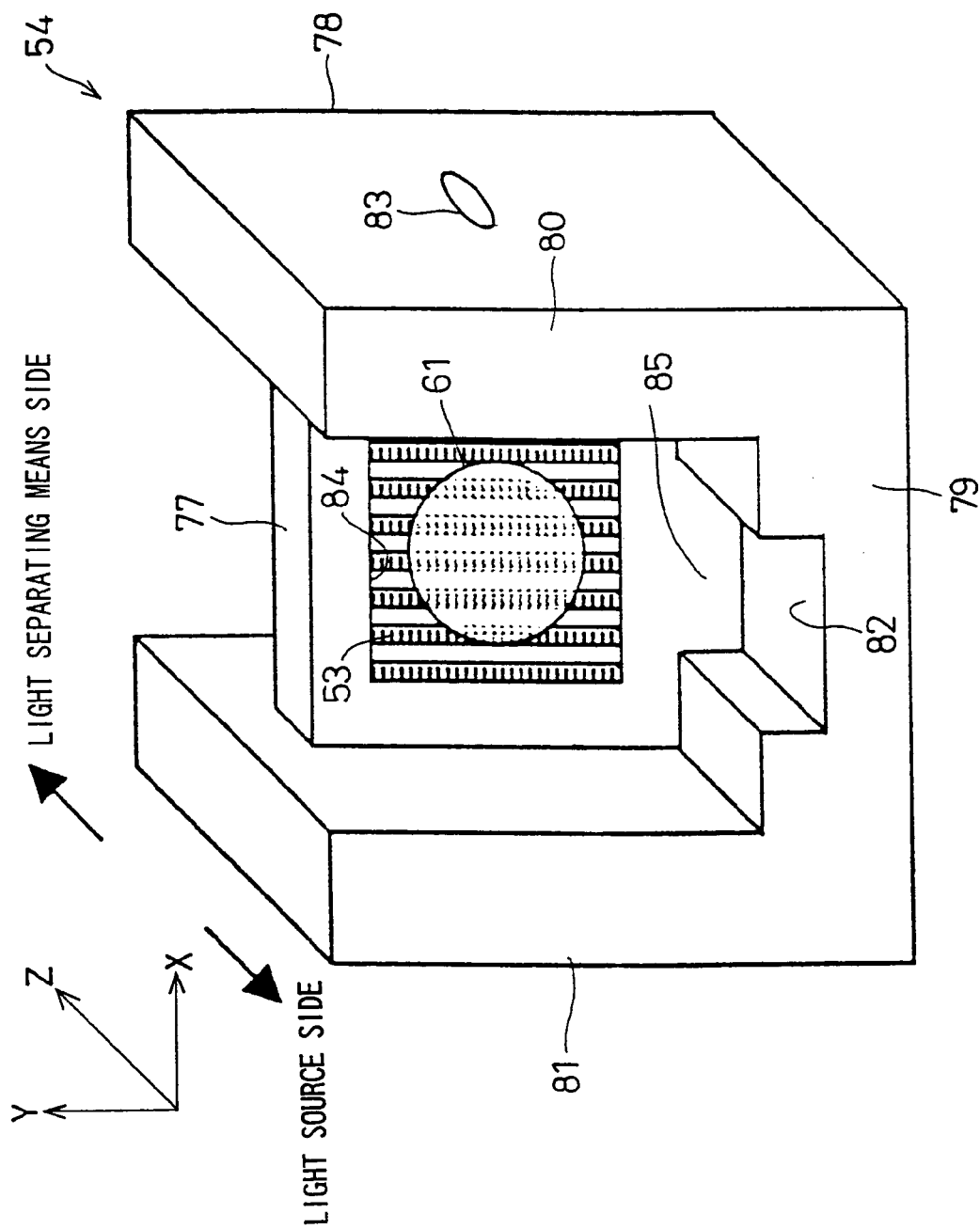
FIG. 10 is a simplified perspective view showing a structure of grating moving means provided in an optical pick-up apparatus.

FIG. 10 is a simplified perspective view showing a structure of the grating moving means 54 provided in the optical pick-up apparatus 76. FIG. 10 is a perspective view facing a light beam 61 irradiating surface of the diffraction grating 53 from the semiconductor laser 51 side. The grating moving means 54 comprises a holding member 77 for holding the diffraction grating 53, and a housing 78 which is attached to the holding member 77 so as to be slidable. The housing 78 is a member which is formed in a substantially U-shape in a cross section perpendicular to Z axis direction, and comprises a base part 79, and first and second upright parts 80 and 81 which are connected to both ends of the base part 79 and upright perpendicular from both ends of the base part 79. In the base part 79, a guiding groove 82 is formed which faces the inside of the housing and extends in Z axis direction. In a substantially center of the first upright part 80, an elongated hole 83 is formed which penetrates the first upright part 80 and extends longitudinally in X axis direction.

The holding member 77 is a member having a generally rectangular parallelepiped shape, in which an aperture 84 which can transmit light inside is formed, and the diffraction grating 53 is fixed to the aperture 84. In a condition of fixing the diffraction grating 53, in the holding member 77, a guiding protrusion 85 is formed which protrudes in a direction perpendicular to the extension direction of the grating groove of the diffraction grating 53. The holding member 77 and the diffraction grating 53 fixed to the holding member 77 are attached to the housing 78 so that the guiding protrusion 85 is engaged with the guiding groove 82 formed on the base part 79 of the housing 78. The guiding protrusion 85 is arranged so as to be slidable with respect to the guiding groove 82 formed in the base part 79, and further, in a condition where the holding member 77 is attached to the housing 78, both end surfaces of the holding member 77 in X axis direction are structured so as to be slidable on surfaces facing the inside of the housing in the first and second upright parts 80 and 81. Since the housing 78 is fixed to a casing (not shown) of the optical pick-up apparatus 76, the diffraction grating 53, which is held by the holding member 77, can vary positions relatively against another optical members of the optical pick-up apparatus 76, by moving the diffraction grating 53 together with the holding member 77 against the housing 78.

A movement of the diffraction grating 53 against the housing 78 is carries out in the following way for example. A fitting hole is previously formed in a position matching with the elongated hole 83, on a slidable surface of the holding member 77 against the first upright part 80. A rod-like controlling jig is provided which can cause the controlling jig to be fitted to the elongated hole. The controlling jig is fitted into the fitting hole of the holding member 77 through the elongated hole 83. The holding member and the diffraction grating 53 fixed to the holding member 77 is moved in Z axis direction by moving the controlling jig in Z axis direction. Thus, the holding member 77 and the diffraction grating 53 is positioned.

Figure 11:
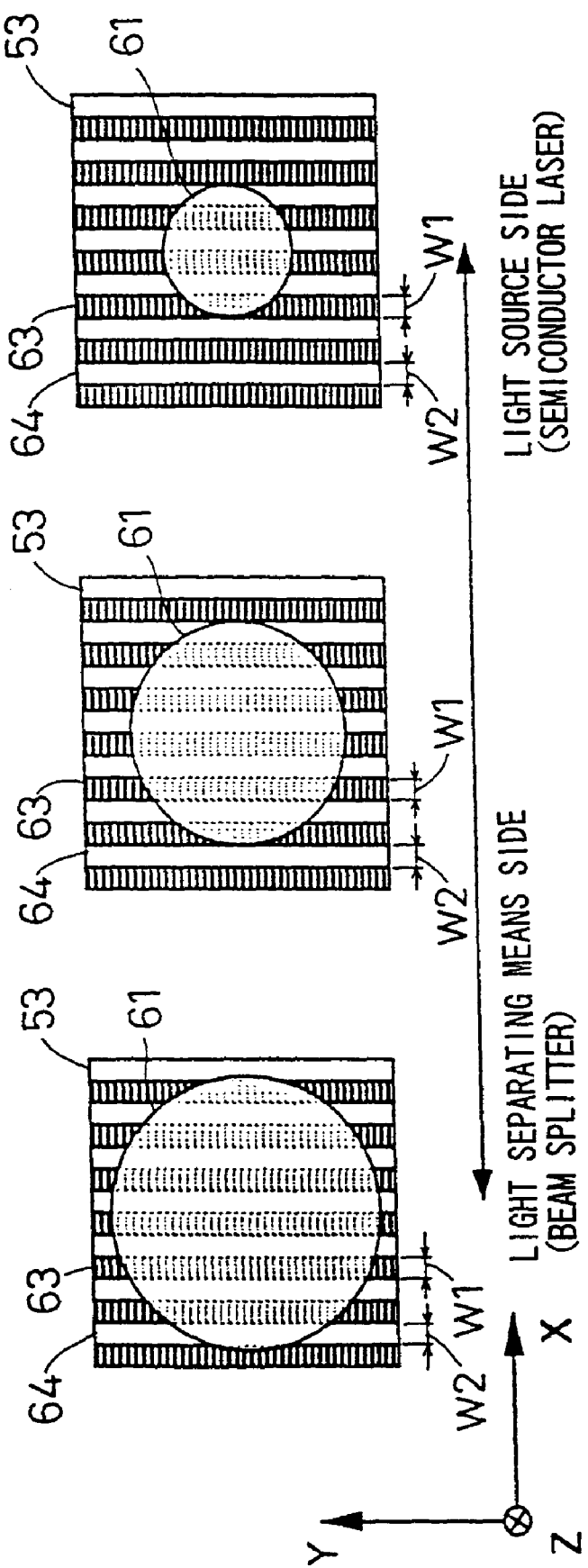
FIGS. 11A to 11C are views showing irradiation status of light beam with respect to the diffraction grating arranged movably in various positions along with Z axis direction.

FIGS. 11A to 11C are views showing an irradiation status of the light beam 61 against the diffraction grating 53 arranged in various positions in X axis direction. FIG. 11A shows a status where the diffraction grating 53 is positioned closer to the beam splitter 55 as light separating means in Z axis direction as an optical axis direction. FIG. 11C shows a status where the diffraction grating 53 is positioned closer to the semiconductor laser 51 as a light source. FIG. 11B shows a status where the diffraction grating 53 is positioned in the middle of the positions shown in the FIG. 11A and FIG. 11C.

A number of the diffraction area 63 which provides a phase difference and the diffraction area 64 which provides no phase difference included in the effective diameter D of the light beam 61, in other words, the number of divisions m which divides the effective diameter D by the width W1 or W2 of the diffraction area 63 or the diffraction area 64, is most largest when the diffraction grating 53 is positioned closer to the beam splitter 55, and reduces as moving toward a position closer to the semiconductor laser 51.

For example, in a condition where the diffraction grating 53 is in the middle position shown in FIG. 11B, it assumes that an area ratio between the diffraction area 63 which provides a phase difference and the diffraction area 64 which provides no phase difference included in the effective diameter D of the light beam 61, is the closest to 1, and the amplitude of the push pull signals SPP1 and SPP2 from the SB1 and the SB2 is minimum. In that case, when the diffraction grating 53 moves from the middle position to the beam splitter 55 side and the number of divisions m shown in FIG. 11A increases, or when the diffraction grating 53 moves from the middle position to the semiconductor laser 51 side and the number of divisions m shown in FIG. 11C decreases, the area ratio between the diffraction area 63 which provides a phase difference and the diffraction area 64 which does not provide a phase difference included in the effective diameter D of the light beam 61, deviates from 1 in comparison with a case where the diffraction grating 53 is in the middle position shown in FIG. 11B. Therefore, the amplitude of the push pull signals SPP1 and SPP2 from the SB1 and the SB2 becomes larger.

Adversely, in an initial assemble condition of the apparatus, when the position of the diffraction grating 53 in Z axis direction is at the position where the amplitudes of the push pull signals SPP1 and SPP2 from the SB1 and the SB2 becomes larger in FIGS. 11A and 11C, it is possible to control to move at the position of the diffraction grating 53 in Z axis direction shown in FIG. 11B, i.e., a preferable position where the amplitude of the push pull signals SPP1 and SPP2 from the SB1 and the SB2 becomes minimum value, by using the grating moving means 54. It is possible to suppress further the occurrence of the track offset, by selecting and arranging the position of the diffraction grating 53 in Z axis direction at the preferable position.

Figure 12:
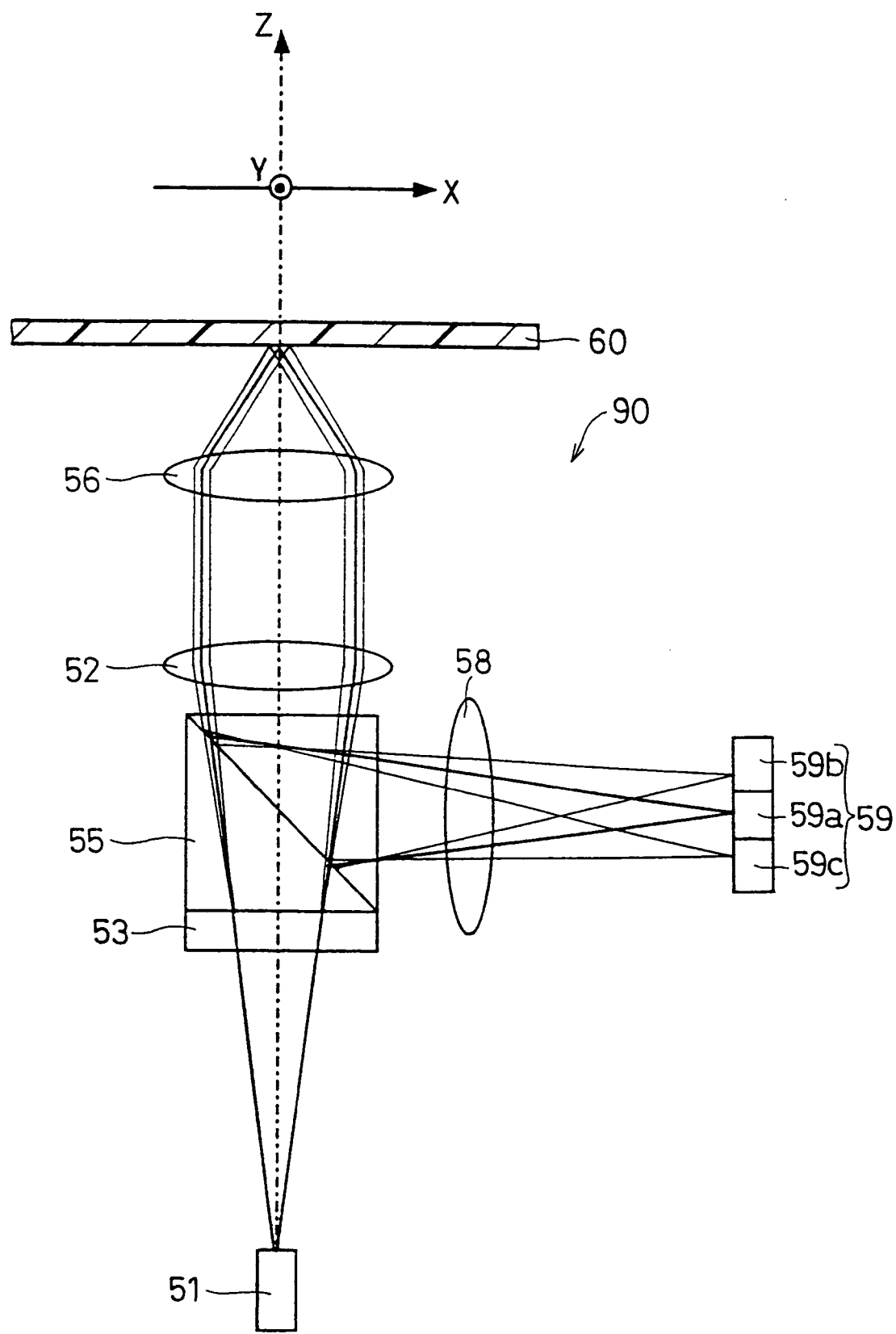
FIG. 12 is a simplified schematic diagram showing a structure of an optical pick-up apparatus according to a fifth embodiment of the invention.
Figure 13:
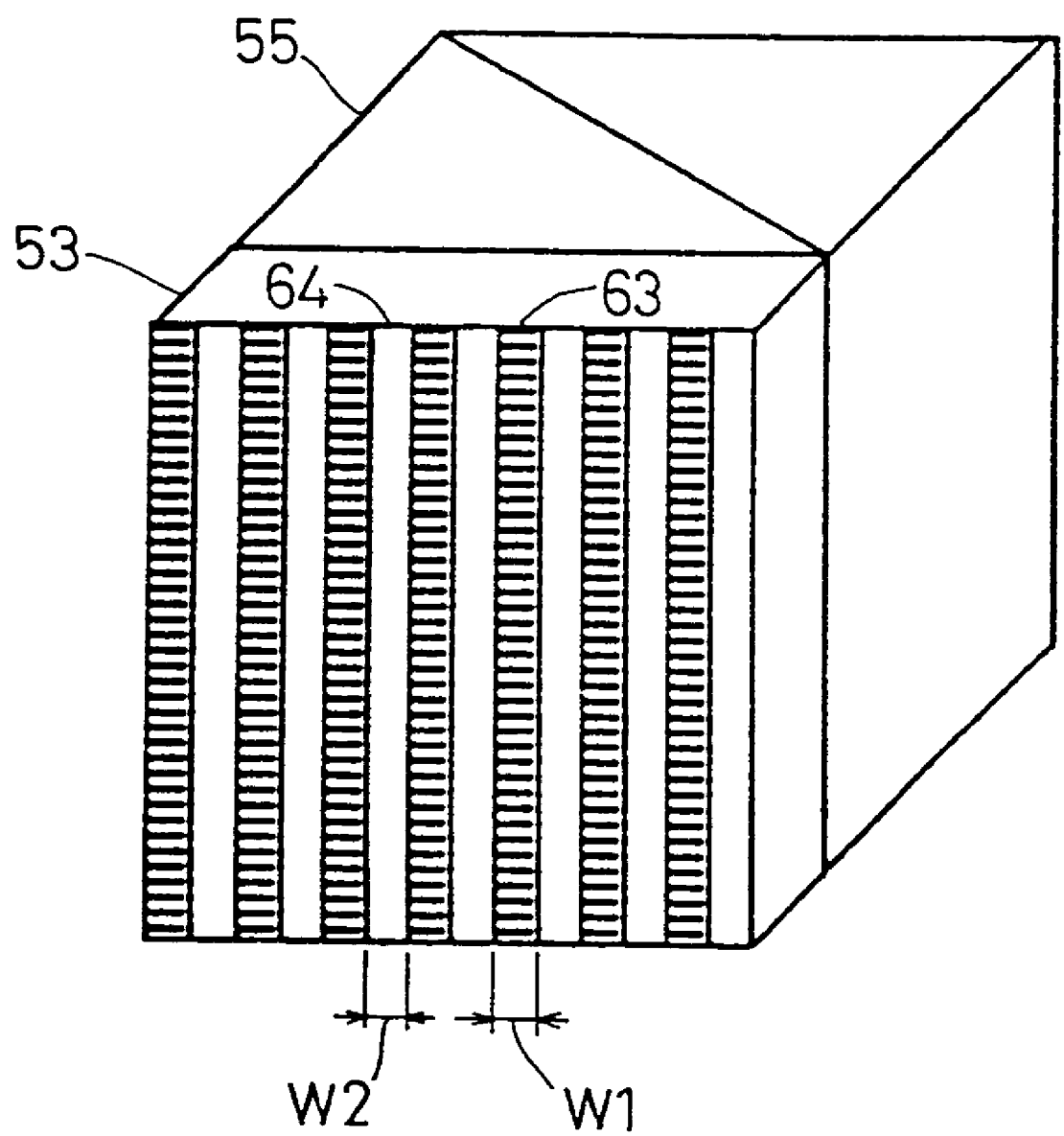
FIG. 13 is a simplified perspective view of a structure of a diffraction grating provided in the optical pick-up apparatus shown in FIG. 12.

FIG. 12 is a simplified schematic diagram showing a structure of the optical pick-up apparatus according to a fifth embodiment of the invention. FIG. 13 is a simplified schematic diagram showing a structure of the diffraction grating 53 provided in the optical pick-up apparatus 90 shown in FIG. 12. The optical pick-up apparatus 90 of the embodiment is similar to the optical pick-up apparatus 75 of the third embodiment. Accordingly, the same components as those described before will be denoted by the same reference numerals, and a repetition of a description thereof will be omitted. A remarkable point of the optical pick-up apparatus 90 is that the diffraction grating 53 is attached adjacent to a side of the beam splitter 55 closer to the semiconductor laser 51.

Figure 14:
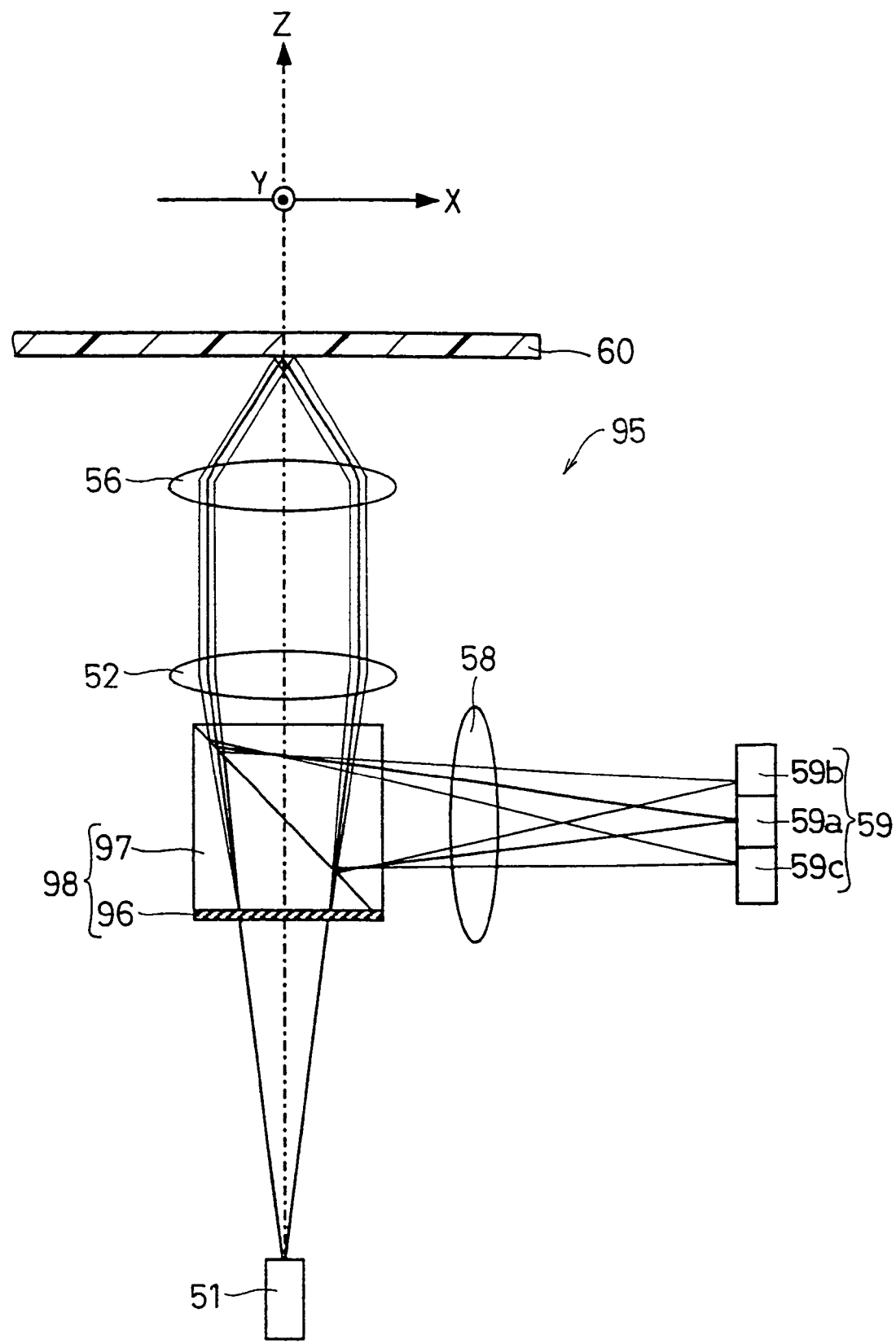
FIG. 14 is a simplified schematic diagram showing a structure of an optical pick-up apparatus according to a sixth embodiment of the invention.
Figure 15:
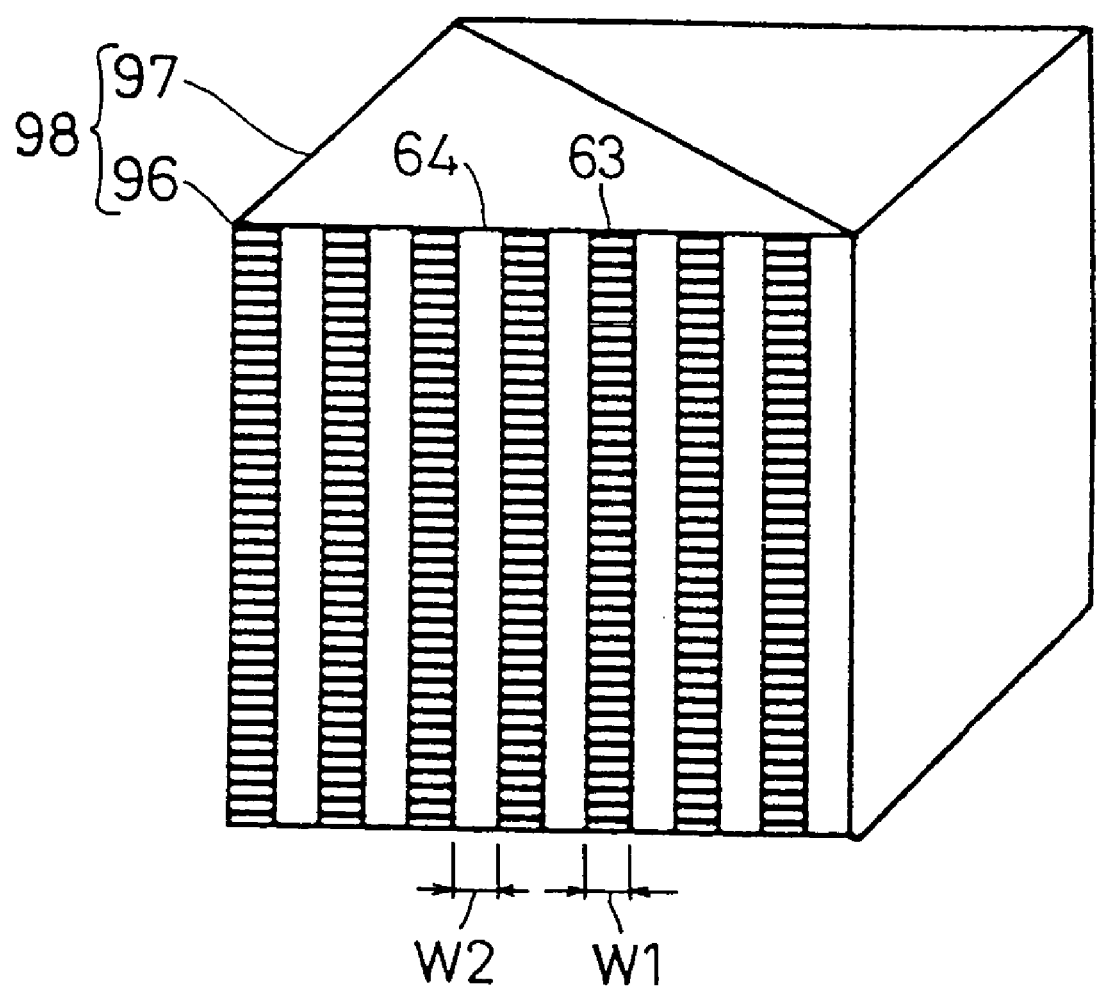
FIG. 15 is a simplified schematic view of a diffraction grating and a beam splitter provided in the optical pick-up apparatus shown in FIG. 14.
Figure 16:
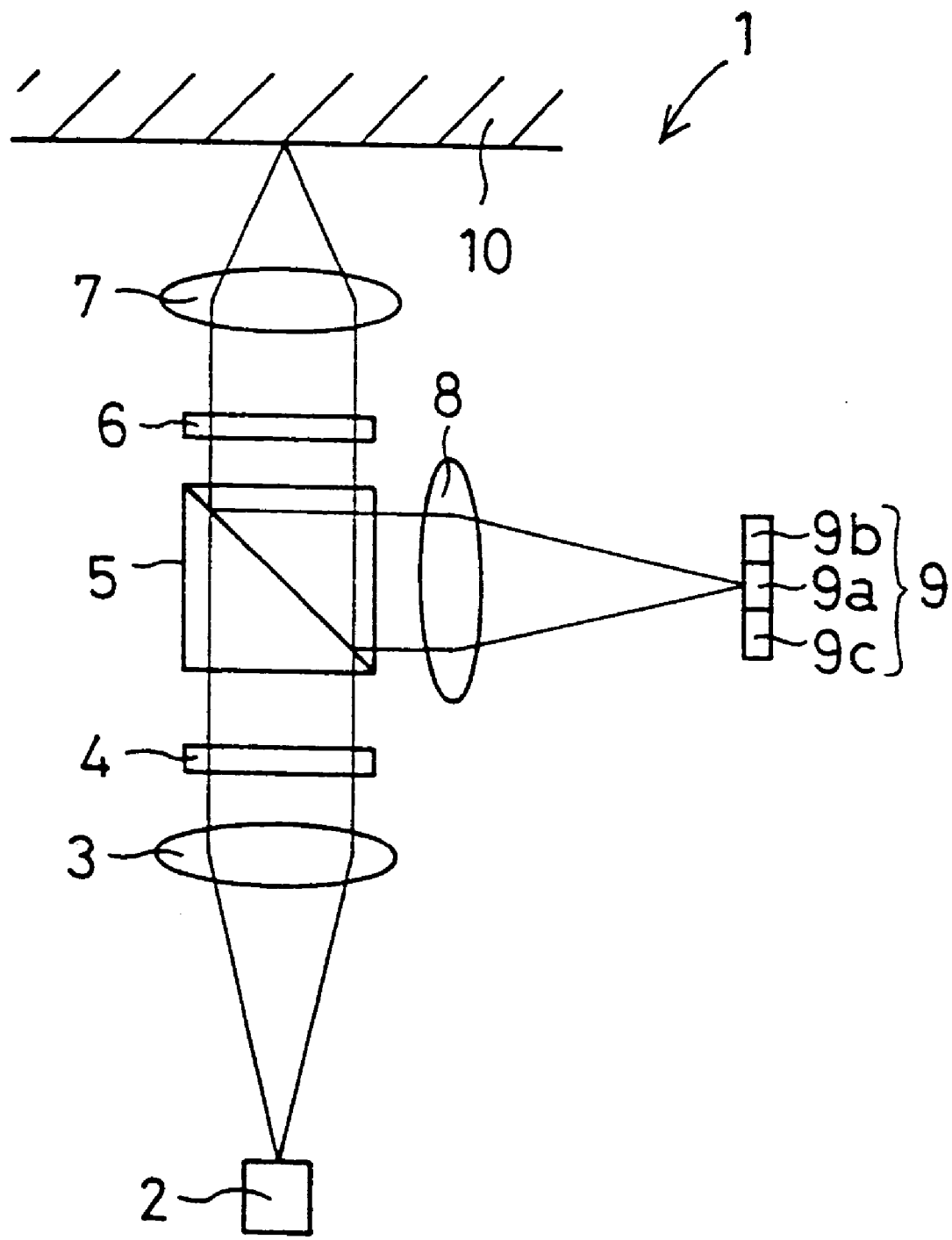
FIG. 16 is a simplified schematic diagram of a structure of the conventional optical pick-up apparatus using DPP method.
Figure 17A:
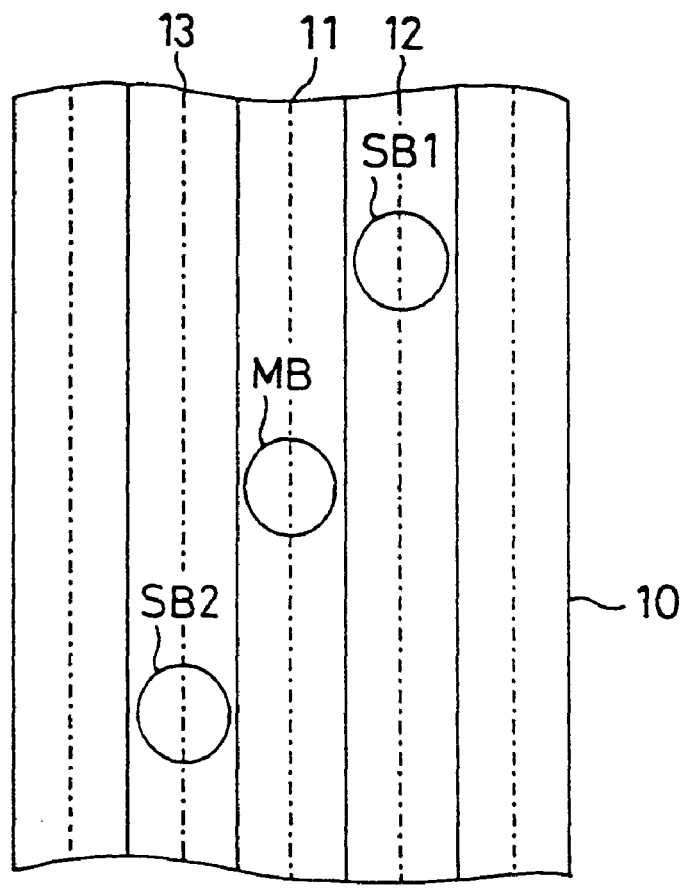
FIGS. 17A and 17B are views showing statuses of zero-order diffraction light and ± first-order diffraction light with which an optical recording medium is irradiated.
Figure 17B:
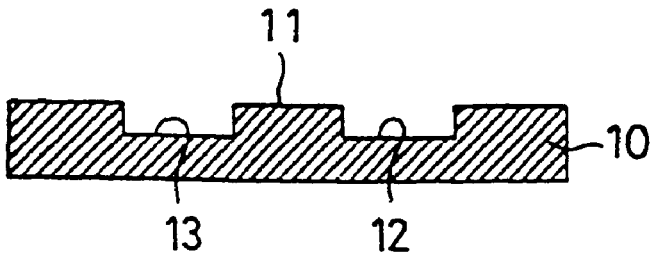
Figure 18:
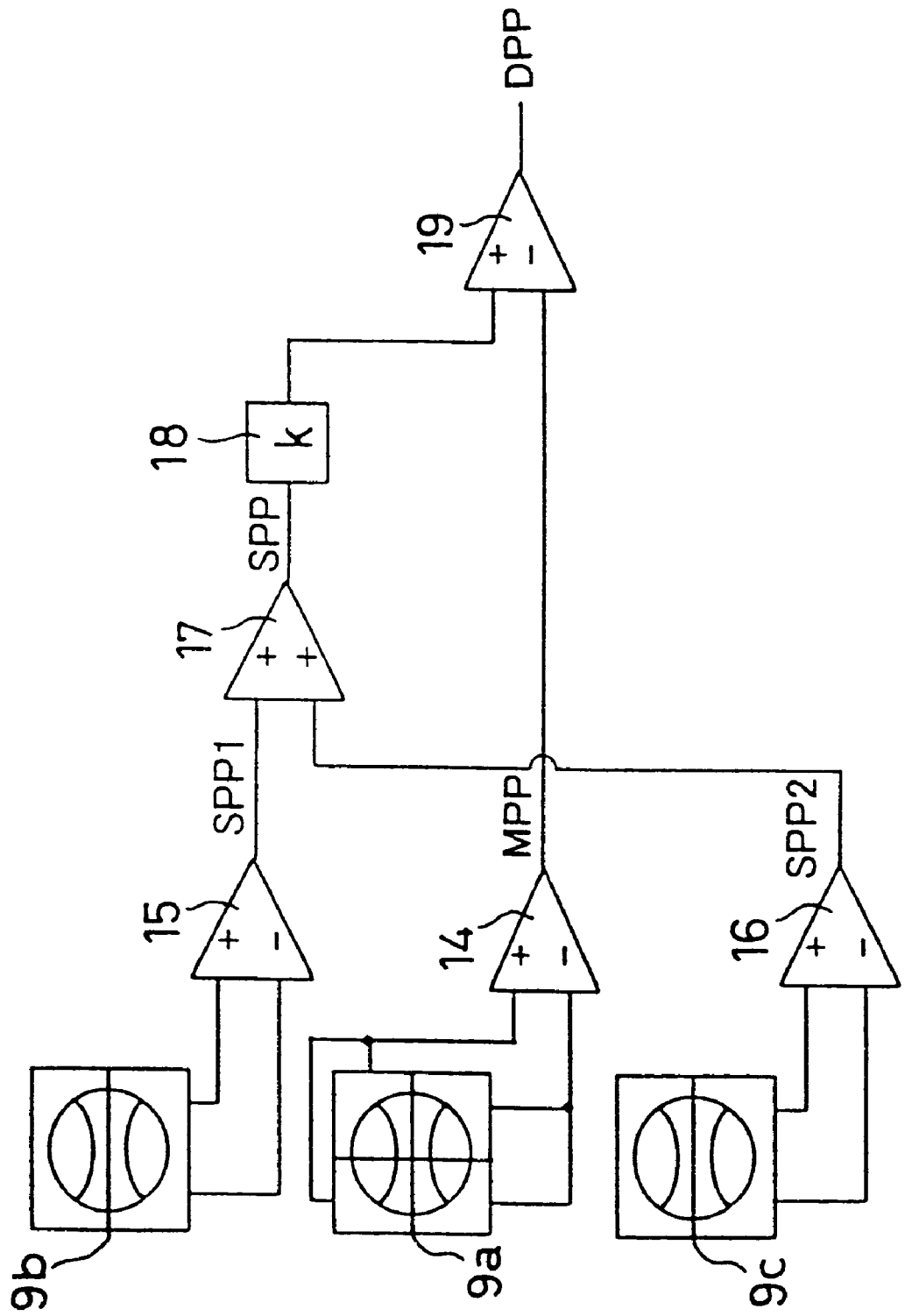
FIG. 18 is a schematic view showing a circuit for obtaining a DPP signal based on a detecting signal from photodetectors.
Figure 19:
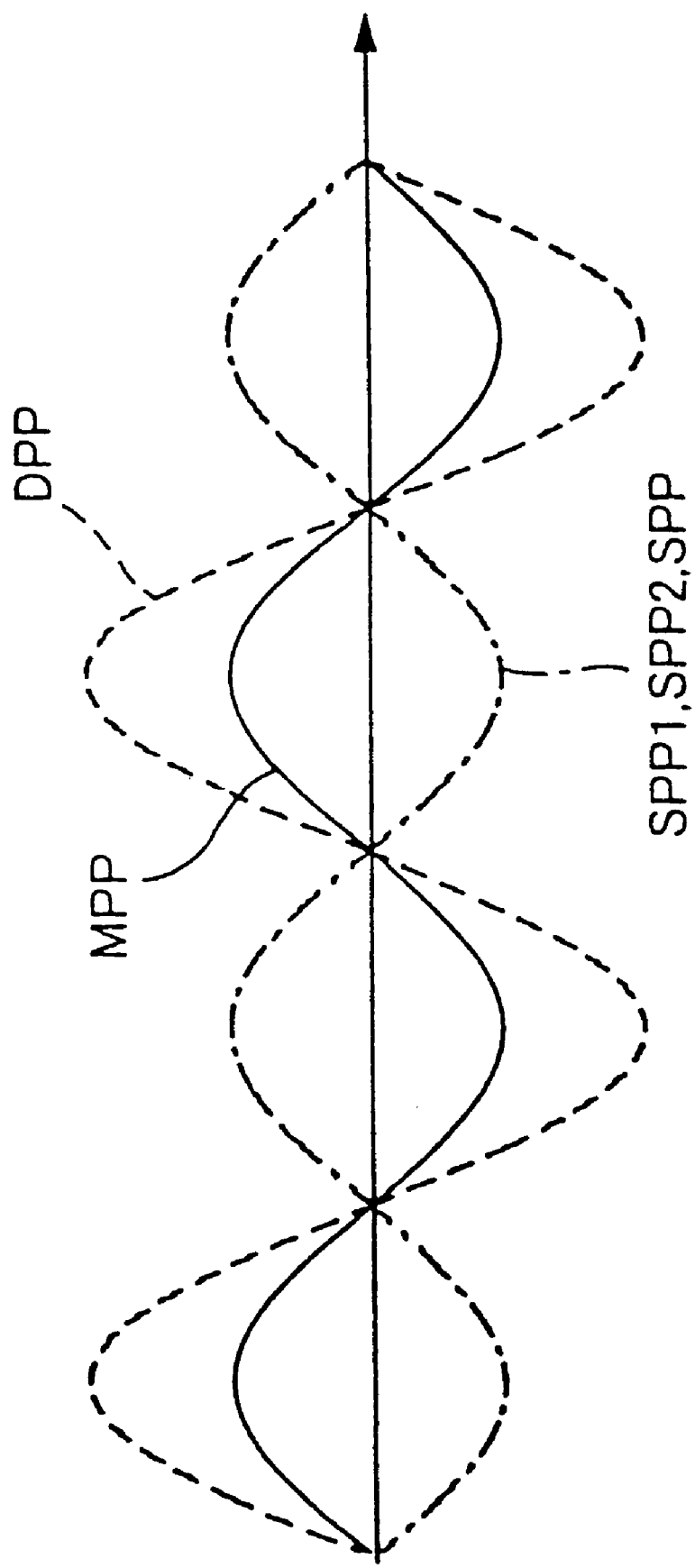
FIG. 19 is a view showing one example of push pull signals.
Figure 20:
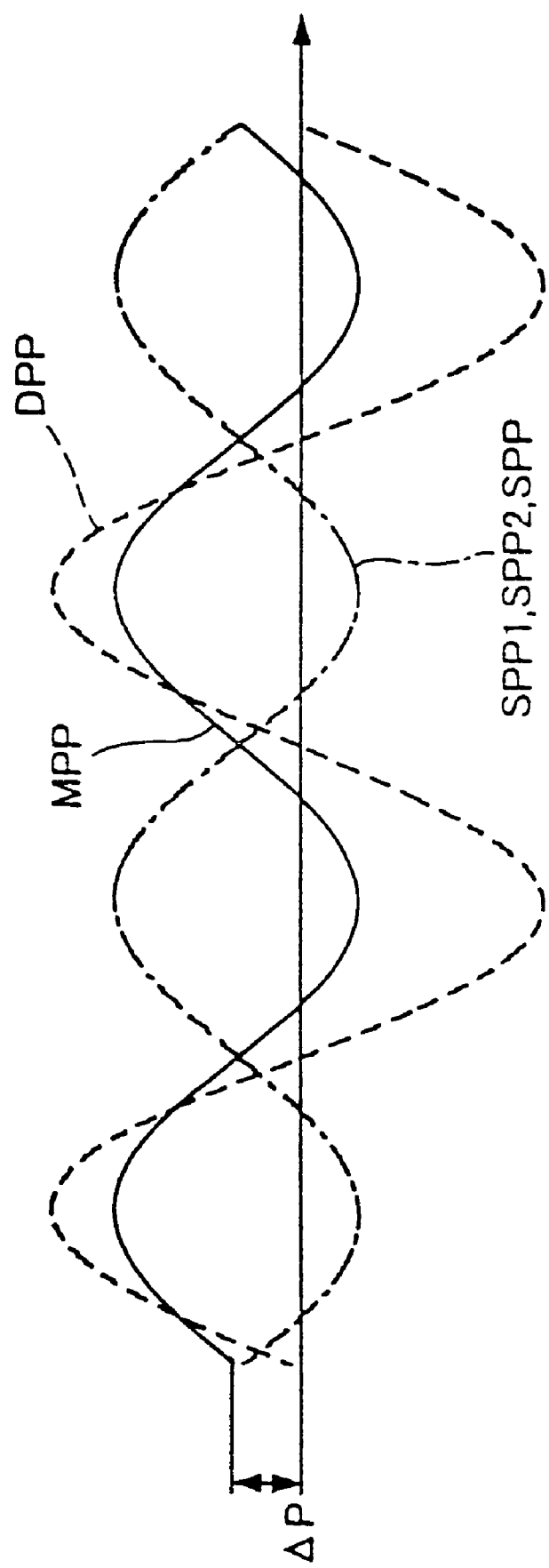
FIG. 20 is a view showing one example of push pull signals when offset ΔP generates.

FIG. 14 is a simplified schematic diagram showing a structure of the optical pick-up apparatus 95 according to a sixth embodiment of the invention. FIG. 15 is a simplified schematic view of the diffraction grating 96 provided with the optical pick-up apparatus 95 shown in FIG. 14. The optical pick-up apparatus 95 of the embodiment is similar to the optical pick-up apparatus 75 of the third embodiment. Accordingly, the same components as those described before will be denoted by the same reference numerals, and a repetition of a description thereof will be omitted. A remarkable point of the optical pick-up apparatus 95 is that the diffraction grating 96 is formed on a side of the beam splitter 97 closer to the semiconductor laser 51 and integrated with the beam splitter 97 as a single optical part 98.

With respect to the diffraction grating 53 (or possible 70), it is possible to make smaller the amplitude of the push pull signals SPP1 and SPP2 from the SB1 and the SB2. Therefore, there is no necessity to adjust the rotation position so that the SB1 and the SB2 are arranged on predetermined positions of the track on the optical recording medium 60. Accordingly, as the optical pick-up apparatus 90 and 95 of the fifth and sixth embodiments of the invention, it is possible to attach the diffraction grating 53 adjacent to the side of the beam splitter 55 closer to the semiconductor laser 51, or to form the diffraction grating 96 on a side of the beam splitter 97 closer to the semiconductor laser 51 and integrate the diffraction grating 96 with the beam splitter 97 as a single optical part 98.

Thereby, it is possible to eliminate the holder to hold the diffraction grating 53 and 96. Therefore, the number of the parts can be reduced, and the intervals between the diffraction grating 53 and 96 and the beam splitter 55 and 97 can be zero, which contributes to downsizing of the apparatus. Further, when the diffraction grating is positioned in a converged light in the same way as parallel light, in a case where a distance between the objective lens and the diffraction grating is long, light volume loss occurs in the SB1 and the SB2 due to an aperture limit of the objective lens. However, by making the intervals between the beam splitter 55 and 97 and the diffraction grating 53 and 96 zero, the distance between the objective lens 56 and the diffraction grating 53 and 96 can be shorter. Therefore, it is possible to contribute to suppress the light volume loss of the SB1 and the SB2.

As mentioned above, in the embodiment, the number of divisions m of the effective diameter D of the light beam 61 in X axis direction is 10, and the number of divisions n in Y axis direction is 2. However, not limited to these numbers, it is possible to select an arbitrary integer of 3 or more as for the number of divisions m, and an arbitrary integer of 2 or more as for the number of divisions n.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pick-up apparatus which optically records information into an optical recording medium and/or reproduces information from an optical recording medium, comprising:
    a light source for irradiating light;
    a collimator lens for changing the light irradiated from the light source to a substantially parallel light;
    a diffraction grating for diffracting the light irradiated from the light source at least to zero-order diffraction light, plus (+) first-order diffraction light and minus (−)

first-order diffraction light, and for providing a phase difference to part of the + and −(±) first order diffraction light;

light converging means for converging the zero-order diffraction light and the ±first order diffraction light onto the optical recording medium;

light separating means, disposed between the light source and the light converging means, for transmitting and reflecting the zero-order diffraction light and the ±first order diffraction light; and light detecting means including a plurality of light receiving elements, for receiving the zero-order diffraction light and the ± first order diffraction light reflected by the optical recording medium, wherein in the diffraction grating, a diffraction area which provides a phase difference to the ±first order diffraction light and a diffraction area which provides no phase difference to the ±first order diffraction light are alternately disposed adjacent to each other in an extension direction of a grating groove, and wherein the diffraction grating is formed so that a width W1 which is a length of a diffraction area which provides a phase difference in the extension direction of the grating groove and a width W2 which is a length of a diffraction area which provides no phase difference in the extension direction of the grating groove, meet the following formula (W1=W2=D/m), where D denotes an effective diameter of a light beam irradiated from the light source and irradiates to the diffraction grating, and m denotes a number of divisions into which the effective diameter D of the light beam is equally divided in a grating groove direction (m is an integer of 3 or more).

2. The optical pick-up apparatus of claim 1, wherein a plurality of the diffraction gratings are adjacent to each other in a direction perpendicular to the extension direction of the grating groove, and the diffraction gratings adjacent to each other are arranged so as to shift by the width W1 (=W2) in the extension direction of the grating groove, and wherein, when a number of divisions into which the effective diameter D of the light beam is equally divided in the direction perpendicular to the grating groove direction is n (n is an integer of 2 or more), a height H which is a length in the direction perpendicular to the extension direction of the grating groove of the diffraction grating, meets the following formula (H=D/n).

3. The optical pick-up apparatus of claim 1, wherein the diffraction grating is disposed between the light source and the collimator lens.

4. The optical pick-up apparatus of claim 2, wherein the diffraction grating is disposed between the light source and the collimator lens.

5. The optical pick-up apparatus of claim 1, further comprising grating moving means for moving the diffraction grating in a direction parallel to an axis of light irradiated from the light source.

6. The optical pick-up apparatus of claim 2, further comprising grating moving means for moving the diffraction grating in a direction parallel to an axis of light irradiated from the light source.

7. The optical pick-up apparatus of claim 3, further comprising grating moving means for moving the diffraction grating in a direction parallel to an axis of light irradiated from the light source.

8. The optical pick-up apparatus of claim 1, wherein the diffraction grating is attached adjacent to a side of the light separating means which side is closer to the light source.

9. The optical pick-up apparatus of claim 2, wherein the diffraction grating is attached adjacent to a side of the light separating means which side is closer to the light source.

10. The optical pick-up apparatus of claim 1, wherein the diffraction grating is formed on a side of the light separating means which side is closer to the light source, and the diffraction grating is integrated with the light separating means as a single part.

11. The optical pick-up apparatus of claim 2, wherein the diffraction grating is formed on a side of the light separating means which side is closer to the light source, and the diffraction grating is integrated with the light separating means as a single part.

* * * * *